(12) United States Patent
Itakura et al.

(10) Patent No.: US 9,033,851 B2
(45) Date of Patent: May 19, 2015

(54) MOTOR DRIVE ASSEMBLY FOR A VEHICLE AND A MOTOR VEHICLE

(75) Inventors: Yoshinori Itakura, Iwata (JP); Guodong Li, Iwata (JP)

(73) Assignee: NTN Corporation, Osaka (JP)

( * ) Notice: Subject to any disclaimer, the term of this patent is extended or adjusted under 35 U.S.C. 154(b) by 135 days.

(21) Appl. No.: 13/978,179

(22) PCT Filed: Dec. 28, 2011

(86) PCT No.: PCT/JP2011/080407
§ 371 (c)(1),
(2), (4) Date: Jul. 29, 2013

(87) PCT Pub. No.: WO2012/093636
PCT Pub. Date: Jul. 12, 2012

(65) Prior Publication Data
US 2013/0296129 A1 Nov. 7, 2013

(30) Foreign Application Priority Data

Jan. 7, 2011 (JP) .................................. 2011-002415

(51) Int. Cl.
*F16H 59/74* (2006.01)
*B60W 10/02* (2006.01)
(Continued)

(52) U.S. Cl.
CPC ............... *B60W 10/02* (2013.01); *F16D 21/04* (2013.01); *F16D 41/088* (2013.01); *F16H 63/30* (2013.01);
(Continued)

(58) Field of Classification Search
USPC ......... 475/198; 477/15, 107, 124; 192/45.006
See application file for complete search history.

(56) References Cited

U.S. PATENT DOCUMENTS 3,447,396 A * 6/1969 Seliger ............................ 74/650
5,224,393 A 7/1993 Ashikawa et al.
(Continued)

FOREIGN PATENT DOCUMENTS

JP 04-019462 1/1992
JP 06-001164 1/1994
(Continued)

OTHER PUBLICATIONS

International Search Report issued Mar. 19, 2012 in International (PCT) Application No. PCT/JP2011/080407.
(Continued)

*Primary Examiner* — Ramya Burgess
*Assistant Examiner* — Lillian Nguyen
(74) *Attorney, Agent, or Firm* — Wenderoth, Lind & Ponack, L.L.P.

(57) ABSTRACT

A motor drive assembly can prevent a two-way roller clutch of the current speed ratio and a two-way roller clutch of the next speed ratio from engaging simultaneously, and includes a first-speed friction plate formed with engaging protrusions on the first-speed side, and a shift ring formed with engaging recesses. While the shift ring is in a first-speed shift position SP1f, the engaging protrusions are adapted to be engaged in the engaging recesses, thereby preventing rotation of the shift ring relative to the first-speed friction plate. The shift ring is provided with projections on its inner periphery. The drive assembly further includes an annular protrusion formed with cutouts. When the projections are axially and circumferentially displaced from the respective cutouts, the projections are adapted to interfere with the annular protrusion, thereby preventing axial movement of the shift ring between the first-speed shift position SP1f and a second-speed shift position SP2f.

20 Claims, 20 Drawing Sheets

(51) Int. Cl.

| | | |
|---|---|---|
| *F16D 21/04* | (2006.01) | |
| *F16D 41/08* | (2006.01) | |
| *F16H 63/30* | (2006.01) | |
| *B60L 15/20* | (2006.01) | |
| *B60W 10/08* | (2006.01) | |
| *B60W 10/11* | (2012.01) | |
| *B60K 1/00* | (2006.01) | |
| *B60K 6/52* | (2007.10) | |
| *B60L 11/12* | (2006.01) | |
| *B60L 11/14* | (2006.01) | |
| *F16D 41/067* | (2006.01) | |
| *F16H 61/12* | (2010.01) | |
| *B60K 6/383* | (2007.10) | |
| *B60W 30/19* | (2012.01) | |
| *F16D 41/06* | (2006.01) | |

(52) U.S. Cl.
CPC . *F16H 2061/1204* (2013.01); *F16H 2063/3093* (2013.01); *B60L 15/2054* (2013.01); *B60W 10/08* (2013.01); *B60W 10/11* (2013.01); *B60K 1/00* (2013.01); *B60K 2001/001* (2013.01); *B60K 6/383* (2013.01); *B60K 6/52* (2013.01); *B60W 30/19* (2013.01); *B60L 11/123* (2013.01); *B60L 11/14* (2013.01); *B60L 15/20* (2013.01); *B60L 2210/40* (2013.01); *B60L 2220/42* (2013.01); *B60L 2240/421* (2013.01); *B60L 2240/423* (2013.01); *B60L 2240/486* (2013.01); *B60L 2260/28* (2013.01); *B60L 2270/145* (2013.01); *F16D 41/067* (2013.01); *F16D 2041/0608* (2013.01)

(56) References Cited

U.S. PATENT DOCUMENTS 6,843,748 B2 * 1/2005 Ma et al. .................. 475/221
8,616,087 B2 * 12/2013 Sayama .................... 74/661

FOREIGN PATENT DOCUMENTS

| | | | | |
|---|---|---|---|---|
| JP | 2004-211834 | | 7/2004 | |
| JP | 2004-316825 | | 11/2004 | |
| JP | 2011058534 A | * | 3/2011 | |
| WO | WO 2012128020 A1 | * | 9/2012 | |
| WO | WO 2012165146 A1 | * | 12/2012 | |

OTHER PUBLICATIONS

Written Opinion of the International Searching Authority issued Mar. 19, 2012 in International (PCT) Application No. PCT/JP2011/080407 (with English translation).

* cited by examiner

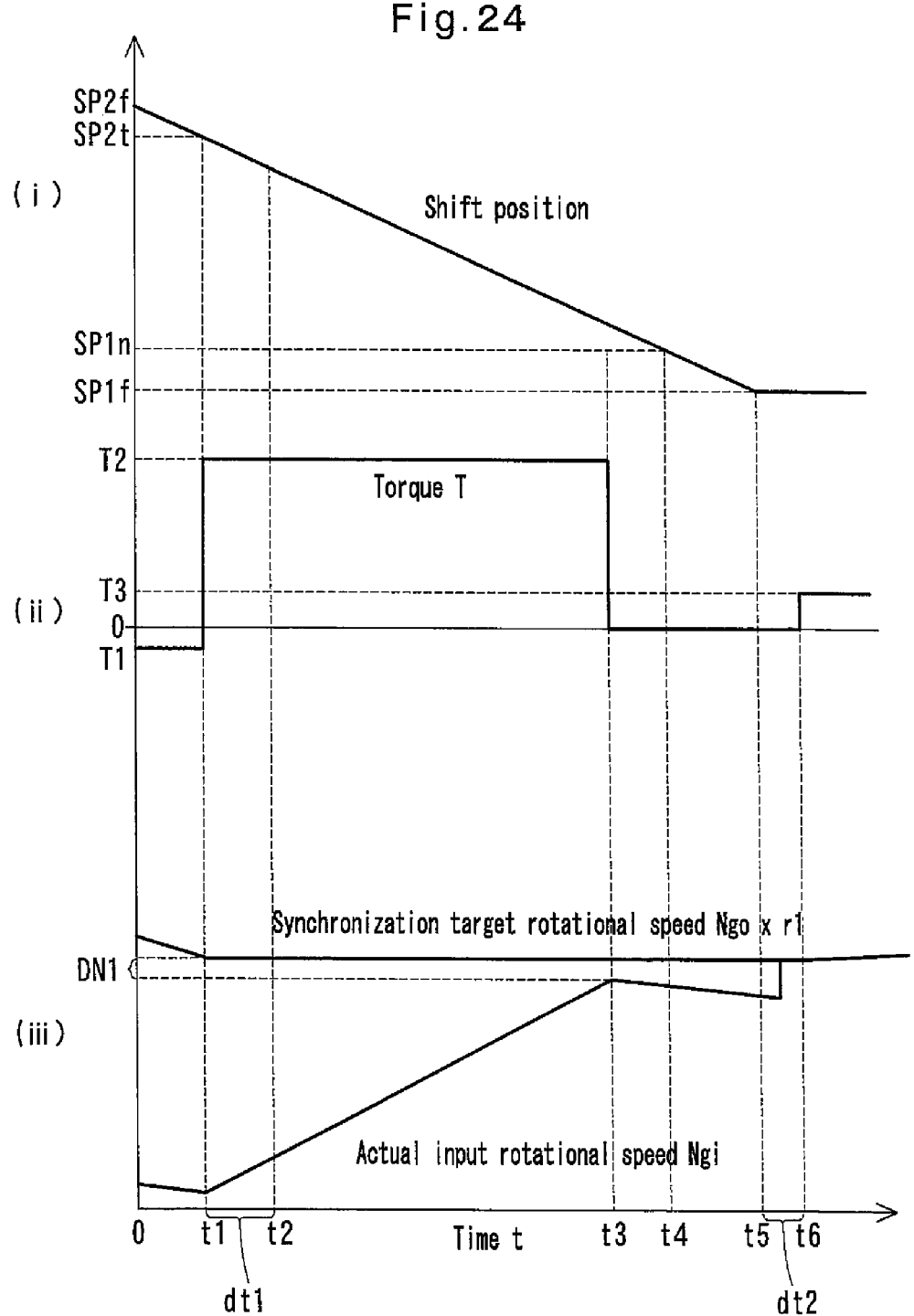

MOTOR DRIVE ASSEMBLY FOR A VEHICLE AND A MOTOR VEHICLE

TECHNICAL FIELD

This invention relates to a motor drive assembly for a vehicle including an electric motor as a driving source and configured to reduce and transmit the rotation of the electric motor to vehicle wheels, and a motor vehicle carrying this motor drive assembly.

BACKGROUND ART

A typical conventional motor drive assembly used in electric vehicles or hybrid vehicles includes an electric motor, a transmission for changing the rotational speed of the electric motor, and a differential for distributing the rotation produced from the transmission to right and left vehicle wheels.

By changing the speed ratio of the transmission of this motor drive assembly according to the travel conditions, it is possible to use the electric motor at the optimum rpm and torque range both while the vehicle is being driven and during regenerative braking.

By using an optimum speed ratio, it is possible to minimize the rotational speeds of rotary members of the transmission and thus the power loss of the transmission, thereby improving the energy efficiency of the vehicle.

The below-identified Patent document 1 discloses a vehicle transmission of the below-described type.

A transmission including an input shaft to which the rotation of an engine is applied, a second-speed input gear and a third-speed input gear mounted on the input shaft, a second-speed output gear and a third-speed output gear meshing with the second-speed and third-speed input gears, respectively, an output gear carrying the second-speed and third-speed output gears, an electromagnetic multiple disk clutch provided in a torque transmission line extending from the engine to the input shaft, wherein the second-speed and third-speed input gears are rotatably supported by bearings, respectively, a second-speed two-way roller clutch through which torque is selectively transmitted between the second-speed input gear and the input shaft, a third-speed two-way roller clutch through which torque is selectively transmitted between the third-speed input gear and the input shaft, and a shifting actuator for selectively engaging either one of the second-speed two-way roller clutch and the third-speed two-way roller clutch, wherein the second-speed two-way roller clutch includes a cylindrical surface formed on the inner periphery of the second-speed input gear, cam surfaces formed on the outer periphery of the input shaft, rollers disposed between the cam surfaces and the cylindrical surface, a second-speed retainer retaining the rollers and rotatable relative to the input shaft between an engaged position where the rollers are engaged between the cam surfaces and the cylindrical surface and a neutral position where the rollers are disengaged, and a switch spring biasing the retainer toward the neutral position, wherein the third-speed two-way roller clutch is similar in structure to the second-speed two-way roller clutch, and wherein the shifting actuator includes a second-speed friction plate rotationally fixed to the retainer on the second-speed side and axially movable between two positions in contact with and away from the side of the second-speed input gear, a separation spring biasing the second-speed friction plate away from the side of the second-speed input gear, a third-speed friction plate rotationally fixed to the retainer on the third-speed side and axially movable between two positions in contact with and away from the side of the third-speed input gear, a separation spring biasing the third-speed friction plate away from the side of the third-speed input gear, a shift ring axially movable between a second-speed shift position where the shift ring presses the second-speed friction plate against the side of the second-speed input gear and a third-speed shift position where the shift ring presses the third-speed friction plate against the side of the third-speed input gear, and a shift mechanism for axially moving the shift ring.

With this transmission, while the shift ring is in the second-speed shift position, due to the frictional force between the side of the second-speed input gear and the surface of the second-speed friction plate in contact with the side of the second-speed input gear, the second-speed friction plate rotates relative to the input shaft, thus rotating the retainer on the second-speed side, which is rotationally fixed to the second-speed friction plate, from the neutral position to the engaged position. The second-speed two-way roller clutch thus engages.

By axially moving the shift ring of this transmission from the second-speed shift position to the third-speed shift position, it is possible to disengage the second-speed two-way roller clutch and engage the third-speed two-way roller clutch, in the following manner.

When the shift mechanism is activated and the shift ring begins to move axially from the second-speed shift position toward the third-speed shift position, the second-speed friction plate separates from the side of the second-speed input gear under the biasing force of the separation spring. This allows the retainer on the second-speed side to return to the neutral position from the engaged position, disengaging the second-speed two-way roller clutch.

When the shift ring reaches the third-speed shift position, and thus the third-speed friction plate contacts the side of the third-speed input gear, the third-speed friction plate rotates relative to the input shaft due to the frictional force between the contact surfaces, thus moving the retainer on the third-speed side, which is rotationally fixed to the third-speed friction plate, from the neutral position to the engaged position. The third-speed two-way roller clutch thus engages.

Conversely, by axially moving the shift ring from the third-speed shift position to the second-speed shift position, it is possible to disengage the third-speed two-way roller clutch and engage the second-speed two-way roller clutch.

PRIOR ART DOCUMENT(S)

Patent Document(s)

Patent document 1: JP Patent Publication 2004-211834A

SUMMARY OF THE INVENTION

Object of the Invention

In the above-described transmission, if torque is being transmitted through the two-way roller clutch corresponding to the current speed ratio when a trial is made to disengage this two-way roller clutch, this torque acts to prevent disengagement of this two-way roller clutch.

As a result, when the shift mechanism begins to axially move the shift ring from the shift position corresponding to the current speed ratio toward the shift position corresponding to the next speed ratio, the two-way roller clutch of the current speed ratio could remain engaged, even after the friction plate of the current speed ratio has separated from the side of the input gear of the current speed ratio.

In such a case, when the shift ring reaches the shift position corresponding to the next speed ratio, the two-way roller clutches corresponding to the current speed ratio and the next speed ratio are both engaged. In this state, since the torque is transmitted through two paths which are different in speed ratio, the input shaft and the output shaft cannot rotate. This could destroy the transmission.

An object of the present invention is to provide a motor drive assembly for a vehicle which can reliably prevent the two-way roller clutches corresponding to the current and next speed ratios from engaging simultaneously.

Means for Achieving the Object

In order to achieve this object, the present invention provides a motor drive assembly for use in a vehicle, comprising an electric motor, an input shaft to which the rotation of the electric motor is transmitted, a first input gear and a second input gear both mounted on the input shaft, a first output gear and a second output gear meshing with the first input gear and the second input gear, respectively; an output shaft carrying the first output gear and the second output gear, a differential through which the rotation of the output shaft is distributed to right and left wheels, wherein either the first input gear, the second input gear and the input shaft or the first output gear, the second output gear and the output shaft constitute a first control gear, a second control gear and a control gear support shaft, respectively, the first and second control gears being rotatably supported by the control gear support shaft through respective bearings, a first two-way roller clutch through which torque can be selectively transmitted between the first control gear and the control gear support shaft, a second two-way roller clutch through which torque can be selectively transmitted between the second control gear and the control gear support shaft, and a shifting actuator for selectively engaging either one of the first two-way roller clutch and the second two-way roller clutch, wherein the first two-way roller clutch comprises a cylindrical surface formed on one of the inner periphery of the first control gear and the outer periphery of the control gear support shaft, cam surfaces formed on the other of the inner periphery of the first control gear and the outer periphery of the control gear support shaft, rollers mounted between the respective cam surfaces and the cylindrical surface, a first retainer retaining the rollers and rotatable relative to the control gear support shaft between an engaging position where the rollers are engaged between the respective cam surfaces and the cylindrical surface and a neutral position where the rollers are not engaged, and a first switch spring elastically biasing the first retainer toward the neutral position, wherein the second two-way roller clutch comprises a cylindrical surface formed on one of the inner periphery of the second control gear and the outer periphery of the control gear support shaft, cam surfaces formed on the other of the inner periphery of the second control gear and the outer periphery of the control gear support shaft, rollers mounted between the respective cam surfaces and the cylindrical surface, a second retainer retaining the rollers and rotatable relative to the control gear support shaft between an engaging position where the rollers are engaged between the respective cam surfaces and the cylindrical surface and a neutral position where the rollers are not engaged, and a second switch spring elastically biasing the second retainer toward the neutral position, wherein the shifting actuator comprises a first friction plate rotationally fixed to the first retainer and axially movable between a position in contact with a side of the first control gear and a position spaced apart from the side of the first control gear, a first separation spring biasing the first friction plate in a direction away from the side of the first control gear, a second friction plate rotationally fixed to the second retainer and axially movable between a position in contact with a side of the second control gear and a position spaced apart from the side of the second control gear, a second separation spring biasing the second friction plate in a direction away from the side of the second control gear, a shift ring axially movable between a first shift position where the shift ring presses the first friction plate against the side of the first control gear and a second shift position where the shift ring presses the second friction plate against the side of the second control gear, and a shift mechanism for axially moving the shift ring, wherein one and the other of the first friction plate and the shift ring are formed with a first engaging protrusion and a first engaging recess, respectively, the first engaging protrusion and the first engaging recess being configured such that when the shift ring is in the first shift position, the first engaging protrusion is engaged in the first engaging recess, thereby preventing rotation of the shift ring relative to the first friction plate, and when the shift ring is in the second shift position, the first engaging protrusion is not engaged in the first engaging recess, wherein one and the other of the second friction plate and the shift ring are formed with a second engaging protrusion and a second engaging recess, respectively, the second engaging protrusion and the second engaging recess being configured such that when the shift ring is in the second shift position, the second engaging protrusion is engaged in the second engaging recess, thereby preventing rotation of the shift ring relative to the second friction plate, and when the shift ring is in the first shift position, the second engaging protrusion is not engaged in the second engaging recess, wherein a projection and an annular protrusion are formed on one and the other of the inner periphery of the shift ring and the outer periphery of the control gear support shaft, respectively, wherein the annular protrusion is formed with a cutout through which the projection can axially pass, and wherein the projection and the annular protrusion are configured such that when the projection is axially aligned with the cutout of the annular protrusion, the projection can pass through the cutout, thereby allowing axial movement of the shift ring between the first shift position and the second shift position, and when the projection is axially separated from and circumferentially displaced from the cutout of the annular protrusion, the projection interferes with the annular protrusion, thereby preventing axial movement of the shift ring between the first shift position and the second shift position.

With this motor drive assembly for use in a vehicle, while the shift ring is in the first shift position, the first friction plate is brought into contact with the side of the first control gear. Thus, due to the frictional force between the contact surfaces, the first friction plate rotates relative to the control gear support shaft, thus moving the first retainer, which is rotationally fixed to the friction plate, from its neutral position to engaged position. The first two-way roller clutch thus engages.

While the shift ring is in the first shift position, the first engaging protrusion is engaged in the first engaging recess, rotationally fixing the shift ring relative to the first friction plate, thus rotationally fixing the shift ring to the first retainer through the first friction plate. In this state, when the first retainer moves from the neutral position to the engaged position, the shift ring rotates together with the first retainer. This circumferentially displaces the projection and the cutout of the annular protrusion from each other. Thus in this state, if an attempt is made to move the shift ring from the first shift position to the second shift position, as long as the first retainer is in the engaged position, the projection interferes with the annular protrusion, thus preventing movement of the shift ring to the second shift position.

When the shift mechanism is activated such that the shift ring begins to move axially from the first shift position toward the second shift position, the first two-way roller clutch disengages and the second two-way roller clutch engages, in the manner described in detail below.

When the shift mechanism is actuated and the shift ring begins to move from the first shift position toward the second shift position, the first friction plate moves in a direction away from the side of the first control gear under the biasing force of the separation spring. This reduces the friction between the friction plate and the first control gear, allowing the first retainer to move from the engaged position to the neutral position under the biasing force of the switch spring, thus disengaging the first two-way roller clutch.

When the shift ring begins to axially move from the first shift position toward the second shift position, if the first retainer should fail to move from the engaged position to the neutral position due e.g. to torque transmitted through the first two-way roller clutch, the projection is kept circumferentially displaced from the cutout and thus interferes with the annular protrusion, preventing the shift ring from moving axially from the first shift position to the second shift position. This prevents the first two-way roller clutch and the second two-way roller clutch from engaging simultaneously.

On the other hand, if the first retainer moves smoothly from the engaged position to the neutral position simultaneously when the shift ring begins to move axially from the first shift position toward the second shift position, the shift ring and the first friction plate can rotate together with the first retainer until the projection axially aligns with the cutout because the first friction plate is rotationally fixed to the first retainer. This allows the projection to pass through the cutout and thus the shift ring to axially move between the first shift position and the second shift position.

When the shift ring reaches the second shift position, the second friction plate contacts the side of the second control gear, so that the second friction plate rotates relative to the control gear support shaft due to the frictional force between their contact surfaces. This moves the second retainer from the neutral position to the engaged position, thus engaging the second two-way roller clutch.

By axially moving the shift ring from the second shift position to the first shift position, it is possible to disengage the second two-way roller clutch and engage the first two-way roller clutch in the similar manner as described above.

If torque is being transmitted through one of the first and second two-way roller clutches in the current speed ratio when an attempt is made to disengage this roller clutch, this torque makes it difficult to disengage the clutch. Thus, when the shift ring begins to axially move from the current speed shift position toward the next speed shift position, the two-way roller clutch of the current speed ratio could remain engaged even after the current speed friction plate has been separated from the side of the current speed control gear.

In order to reliably disengage, when necessary, the two-way roller clutch of the current speed ratio, the above-described motor drive assembly for a vehicle may includes an electronic control unit for controlling the movement of the shifting actuator and torque generated from the electric motor.

The electronic control unit comprises
a shifting movement start control means for starting movement of the shift ring from one of the first shift position and the second shift position corresponding to the current one of two speed ratios toward the other shift position, which corresponds to the next one of the two speed ratios, when a command is received to shift the speed ratio by disengaging one of the first two-way roller clutch and the second two-way roller clutch corresponding to the current speed ratio and engaging the other two-way roller clutches, which corresponds to the next speed ratio, a position determining means for determining whether the shift ring has reached a predetermined torque control starting position after the control of the shifting movement start control means has been executed, a torque control means for controlling the torque generated from the electric motor such that torque transmitted between the input shaft and the output shaft decreases to zero or is reversed in direction when the shift position determining means determines that the shift ring has reached the torque control starting position; and a synchronization control means for synchronizing the rotational speed of the input shaft with the rotational speed of the output shaft corresponding to the next speed ratio after controlling the torque with the torque control means.

With this arrangement, the torque control means of the electronic control unit controls the torque generated from the electric motor such that the torque transmitted between the input shaft and the output shaft decreases to zero or is reversed in direction. With this arrangement, the torque transmitted between the input shaft and output shafts does not act to prevent disengagement of the two-way roller clutch of the current speed ratio, so that it is possible to reliably disengage the two-way roller clutch of the current speed ratio.

Torque is being transmitted between the input shaft and the output shaft after the shift ring begins to move until the shift ring reaches the torque control starting position. Thus, compared to a conventional arrangement in which the torque generated from the electric motor is controlled such that the torque transmitted between the input shaft and the output shaft decreases to zero as soon as the shift ring begins to move, the period during which torque is not being transmitted between the input shaft and the output shaft is short.

The electronic control unit may further includes a torque direction determining means for determining whether the torque being transmitted between the input shaft and the output shaft is torque in a positive direction that tends to accelerate the output shaft from the input shaft, or torque in a negative direction that tends to decelerates the output shaft from the input shaft, when the command to shift the speed ratio is received. With this arrangement, the torque control means can control the torque generated from the electric motor according to the direction of the torque detected by the torque direction determining means.

The torque control means may e.g. be configured to control the electric motor such that the motor generates negative torque which decelerates the rotation of the motor, if the command to shift the speed ratio is a command to upshift and if the direction of the torque detected by the torque direction determining means is the positive direction. With this arrangement, since the torque transmitted between the input shaft and the output shaft is positively used to disengage the two-way roller clutch of the current speed ratio, it is possible to more reliably disengage the two-way roller clutch of the current speed ratio than when simply reducing the torque generated from the electric motor to zero in an attempt to disengage the two-way roller clutch of the current speed ratio.

Moreover, the negative torque generated from the electric motor serves to decelerate the input shaft, thus shortening the time until the later-stage synchronization is completed.

If the torque control means controls the electric motor such that the motor generates negative torque, the synchronization control means may be configured to maintain the torque generated from the electric motor at the negative torque until the difference between the actual rotational speed of the input shaft and the rotational speed of the input shaft in the next speed ratio which is calculated based on the rotational speed of the output shaft decreases to a predetermined threshold or below, if the command to shift the speed ratio is a command to upshift and if the direction of the torque detected by the torque direction determining means is the positive direction.

Also, the torque control means may e.g. be configured to control the electric motor such that the motor generates positive torque which accelerates the rotation of the motor, if the command to shift the speed ratio is a command to upshift and if the direction of the torque detected by the torque direction determining means is the negative direction. With this arrangement, it is possible to more reliably disengage the two-way roller clutch of the current speed ratio than when simply reducing the torque generated from the electric motor to zero in an attempt to disengage the two-way roller clutch of the current speed ratio.

If the torque control means controls the electric motor such that the motor generates positive torque, the synchronization control means may be configured to control the electric motor such that the motor generates negative torque which decelerates the rotation of the motor, and maintain the torque generated from the electric motor at the negative torque until the difference between the actual rotational speed of the input shaft and the rotational speed of the input shaft in the next speed ratio which is calculated based on the rotational speed of the output shaft decreases to a predetermined threshold or below, if the command to shift the speed ratio is a command to upshift and if the direction of the torque detected by the torque direction determining means is the negative direction.

Also, the torque control means may be e.g. configured to control the torque generated from the electric motor to zero, if the command to shift the speed ratio is a command to downshift and if the direction of the torque detected by the torque direction determining means is the positive direction. With this arrangement, it is possible to minimize the deceleration of the input shaft when disengaging the two-way roller clutch of the current speed ratio, and thus to shorten the time until the later-stage synchronization is completed.

If the torque control means controls the torque generated from the electric motor to zero, the synchronization control means may be configured to control the electric motor such that the motor generates positive torque which accelerates the rotation of the motor, and maintain the torque generated from the electric motor at the positive torque until the difference between the actual rotational speed of the input shaft and the rotational speed of the input shaft in the next speed ratio which is calculated based on the rotational speed of the output shaft decreases to a predetermined threshold or below, if the command to shift the speed ratio is a command to downshift and if the direction of the torque detected by the torque direction determining means is the positive direction.

Also, the torque control means may e.g. be configured to control the electric motor such that the motor generates positive torque which accelerates the rotation of the motor, if the command to shift the speed ratio is a command to downshift and if the direction of the torque detected by the torque direction determining means is the negative direction. With this arrangement, since the torque transmitted between the input shaft and the output shaft is positively used in disengaging the two-way roller clutch of the current speed ratio, it is possible to more reliably disengage the two-way roller clutch of the current speed ratio than when simply reducing the torque generated from the electric motor to zero in an attempt to disengage this clutch. Also, since the input shaft is accelerated by the positive torque generated from the motor, it is possible to shorten the time until the later-stage synchronization is completed.

If the torque control means controls the electric motor such that the motor generates positive torque, the synchronization control means may be configured to maintain the torque generated from the electric motor at positive torque until the difference between the actual rotational speed of the input shaft and the rotational speed of the input shaft in the next speed ratio which is calculated based on the rotational speed of the output shaft decreases to a predetermined threshold or below, if the command to shift the speed ratio is a command to downshift and if the direction of the torque detected by the torque direction determining means is the positive direction.

The present invention also provides an electric vehicle comprising a pair of right and left front wheels provided at a front portion of the vehicle, a pair of right and left rear wheels provided at a rear portion of the vehicle, and the above-described motor drive assembly, which is configured to drive at least one pair of the pairs of front wheels and rear wheels.

The present invention further provide a hybrid vehicle comprising a pair of right and left front wheels provided at a front portion of the vehicle, a pair of right and left rear wheels provided at a rear portion of the vehicle, an engine for driving one pair of the pairs of front wheels and rear wheels, and the above-described motor drive assembly, which is configured to drive the other pair of the pairs of front wheels and rear wheels.

Advantages of the Invention

In the motor drive assembly according to the present invention, if an attempt is made to move the shift ring from the current shift position toward the next shift position with the retainer of the current speed ratio in the engaged position, the projection interferes with the annular protrusion, thus preventing axial movement of the shift ring. Thus, it is impossible to move the shift ring to the next shift position in this state. This reliably prevents the two-way roller clutch of the current speed ratio and the two-way roller clutch of the next speed ratio from engaging simultaneously even if the retainer of the current speed ratio should fail to move from the engaged position to the neutral position due e.g. to torque transmitted through the two-way roller clutch of the current speed ratio, when the shift ring begins to axially move from the current shift position toward the next shift position.

Since, in disengaging the two-way roller clutch of the current speed ratio, the torque generated from the electric motor is controlled such that the torque transmitted between the input shaft and the output shaft decreases to zero or is reversed in direction, the toque transmitted between the input shaft and the output shaft does not act to prevent disengagement of the two-way roller clutch of the current speed ratio. This makes it possible to reliably disengage the two-way roller clutch of the current speed ratio.

BRIEF DESCRIPTION OF THE DRAWINGS

FIGS. 12(I) and 12(II) are sectional views of the anti-rotation portion during acceleration and deceleration of the vehicle, respectively, with the shift ring at the position shown in FIG. 11.

FIGS. 14(I) and 14(II) are sectional views of the anti-rotation portion during acceleration and deceleration of the vehicle, respectively, with the shift ring at the position shown in FIG. 13.

FIG. 24 shows still another typical relationship among the shift position during downshifting, the motor torque, and the rotational speeds of the input shaft and the output shaft.

BEST MODE FOR EMBODYING THE INVENTION

Figure 1:
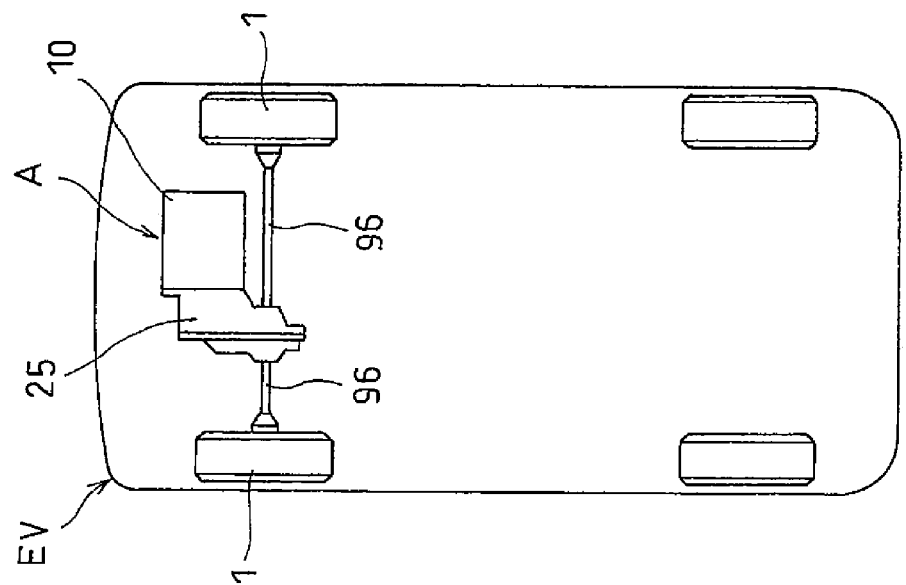
FIG. 1 is a schematic view of an electric vehicle carrying a motor drive assembly for a vehicle according to the present invention.
Figure 2:
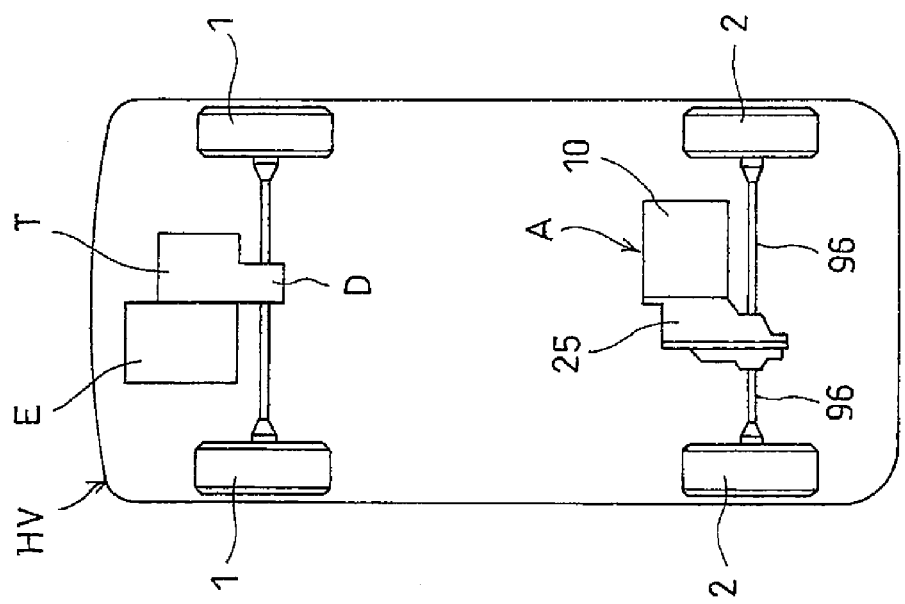
FIG. 2 is a schematic view of a hybrid vehicle carrying the motor drive assembly according to the present invention.

Now referring to the drawings, the embodiment of this invention is described. FIG. 1 shows an electric vehicle EV including a motor drive assembly A according to the present invention, which is configured to drive the pair of (right and left) front wheels 1. FIG. 2 shows a hybrid vehicle HV including an engine E configured to drive the pair of (right and left) front wheels 1 as main drive wheels, and the motor drive assembly A according to the present invention, which is configured to drive the pair of (right and left) rear wheels 2 as auxiliary drive wheels. The rotation of the engine E is transmitted to the front wheels 1 through a transmission T and a differential D.

Figure 3:
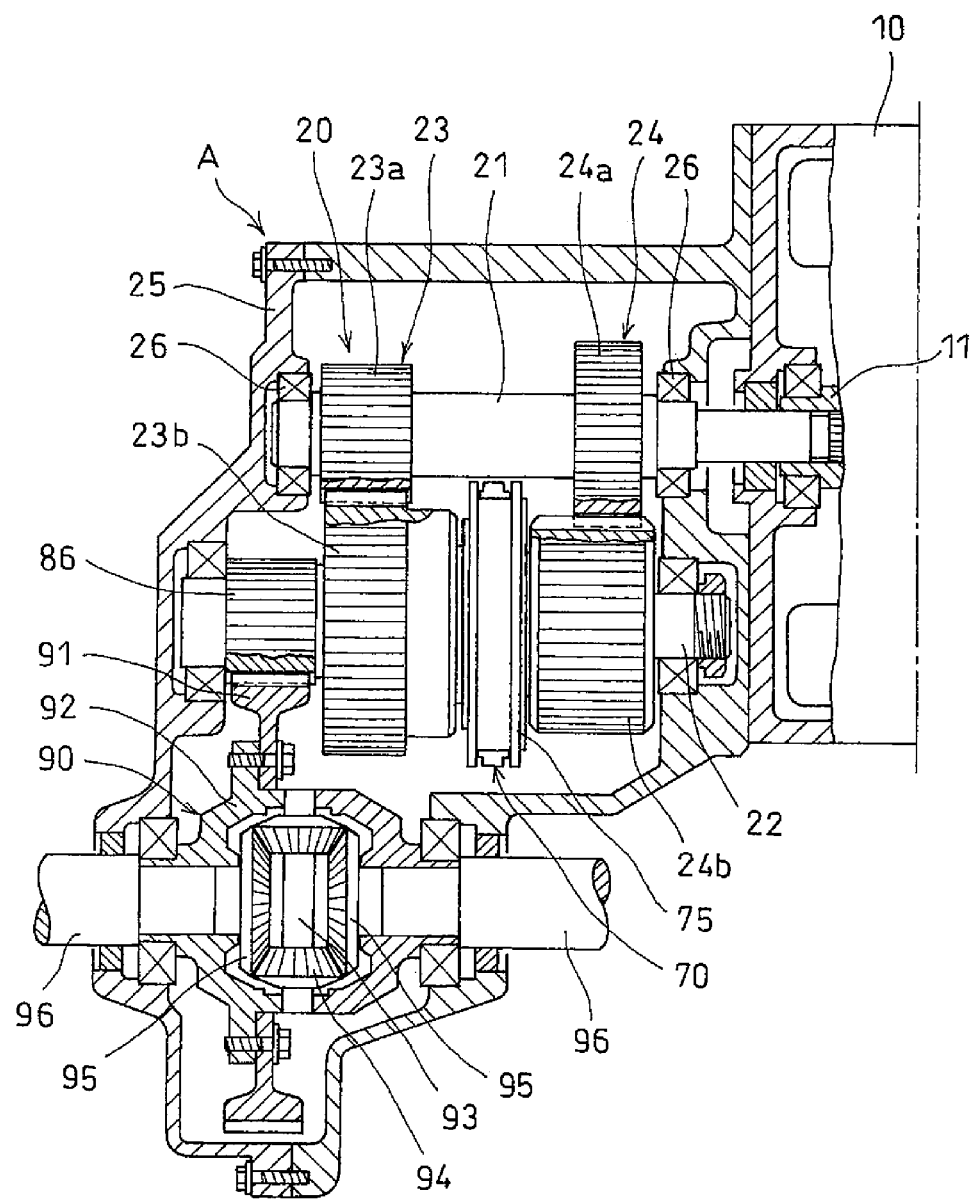
FIG. 3 is sectional view of the motor drive assembly according to the present invention.

As shown in FIG. 3, the motor drive assembly A includes an electric motor 10 having an output shaft 11, a transmission 20 for changing the rotational speed of the output shaft 11 of the motor 10, and a differential 90 through which the rotation produced from the transmission 20 is distributed to the pair of (right and left) front wheels 1 of the electric vehicle EV shown in FIG. 1, or to the pair of (right and left) rear wheels 2 of the hybrid vehicle HV shown in FIG. 2.

The transmission 20 is a constant mesh speed reducer including an input shaft 21, an output shaft 22, and first- and second-speed gear trains 23 and 24 provided between the input and output shafts 21 and 22.

The input and output shafts 21 and 22 are rotatably supported by two opposed pairs of bearings 26, respectively, so as to extend parallel to each other. The input shaft 21 is connected to the output shaft 22 of the electric motor 10.

The first-speed gear train 23 includes a first-speed input gear 23a mounted on the input shaft 21, and a first-speed output gear 23b meshing with the first-speed input gear 23a and rotatably mounted around the output shaft 22.

The second-speed gear train 24 includes a second-speed input gear 24a mounted on the input shaft 21, and a second-speed output gear 24b meshing with the second-speed input gear 24a and rotatably mounted around the output shaft 22. The second-speed gear train 24 is lower in speed reduction ratio than the first-speed gear train 23.

Figure 4:
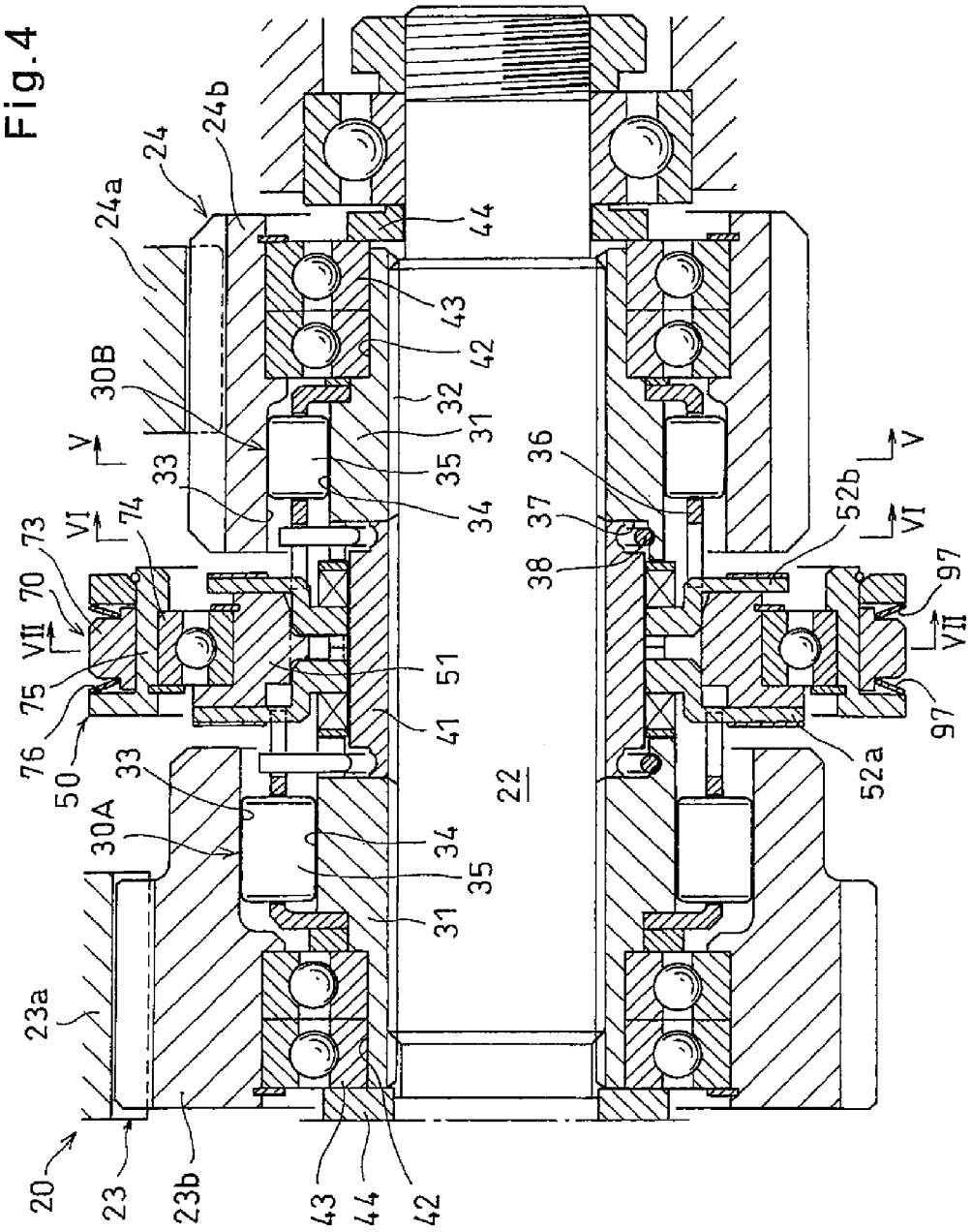
FIG. 4 is an enlarged sectional view of a portion of a transmission shown in FIG. 3.

As shown in FIG. 4, a first-speed two-way roller clutch 30A is mounted between the first-speed output gear 23b and the output shaft 22 for selective transmission of torque between the first-speed output gear 23b and the output shaft 22. A second-speed two-way roller clutch 30B is mounted between the second-speed output gear 24b and the output shaft 22 for selective transmission of torque between the second-speed gear 24b and the output shaft 22.

The first- and second-speed two-way roller clutches 30A and 30B are identical in structure and are mirror images to each other. Thus, only the second-speed two-way roller clutch 30B is described below, and the first-speed two-way roller clutch 30A is not described. The elements of the clutch 30A corresponding to those of the clutch 30B are indicated by identical numerals.

Figure 5:
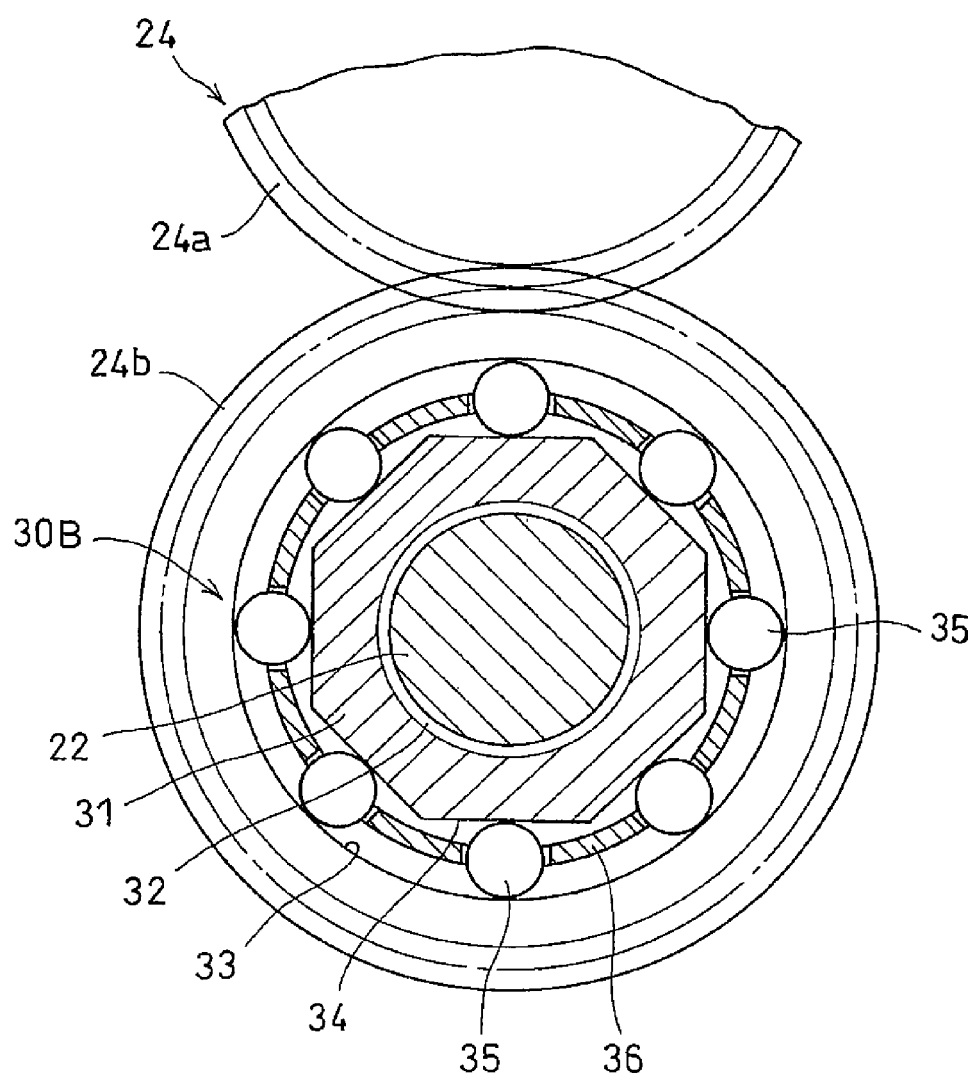
FIG. 5 is a sectional view taken along line V-V of FIG. 4.
Figure 6:
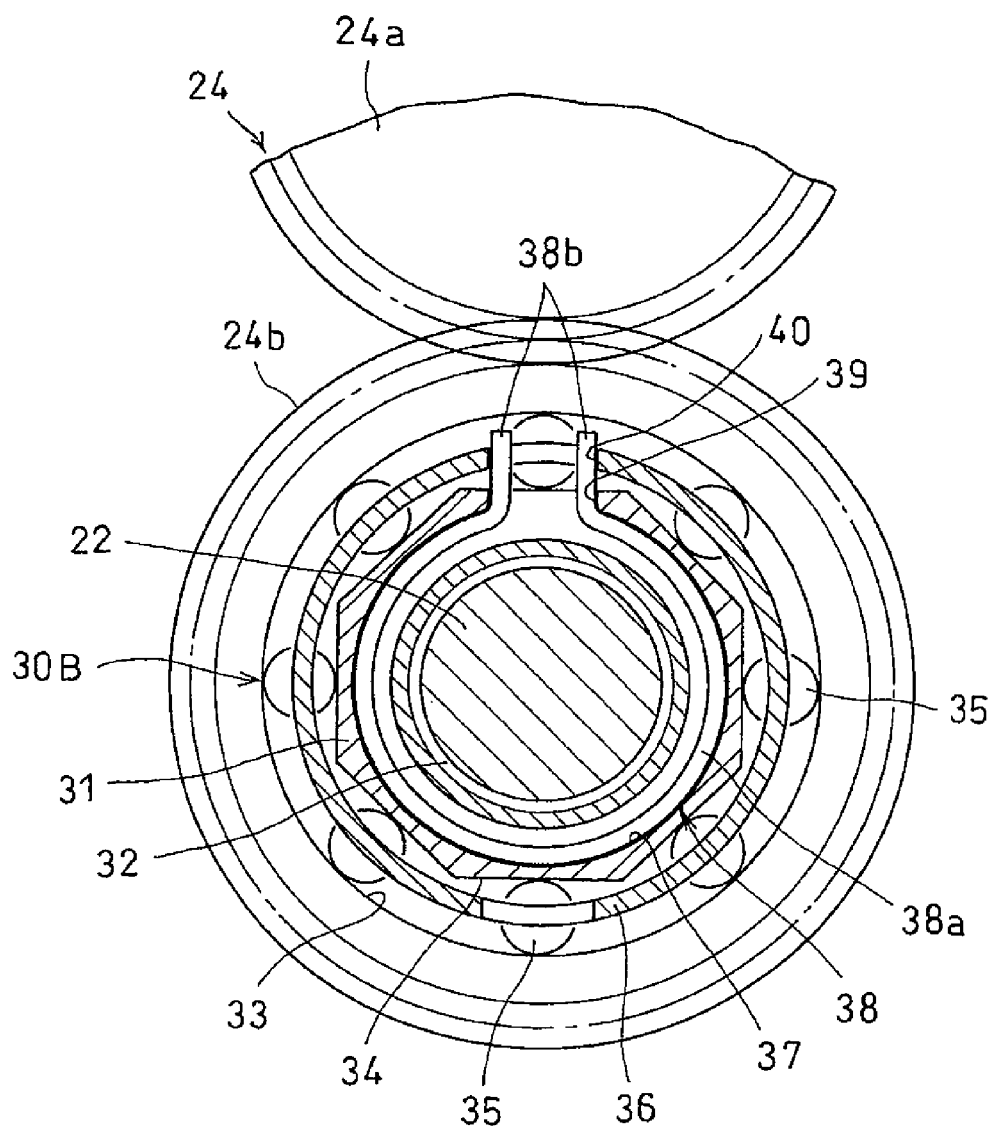
FIG. 6 is a sectional view taken along line VI-VI of FIG. 4.

As shown in FIGS. 4 to 6, the second-speed two-way roller clutch 30B includes an inner ring 31 rotationally fixed to the output shaft 22 by means of splines 32 and formed with a plurality of circumferentially arranged flat cam surfaces 34 of equal circumferential dimensions on the outer periphery of the inner ring 31. The cam surfaces 34 define, in cooperation with a radially inner cylindrical surface 33 of the second-speed output gear 24b, wedge-shaped spaces which narrow toward the respective circumferential ends thereof. The two-way roller clutch 30B further includes rollers 35 as engaging elements disposed between the respective cam surfaces 34 and the cylindrical surface 33, and a retainer 36 mounted between the second-speed output gear 24b and the inner ring 31 and retaining the rollers 35. The retainer 36 is provided around the inner ring 31 so as to be rotatable, relative to the output shaft 22, between an engaged position where the rollers 35 engage the cam surfaces 34 and the cylindrical surface 33 and a neutral position where the roller 35 are not in engagement with the cam surfaces 34 and the cylindrical surface 33.

The two-way clutch 30B further includes a switch spring 38 having a circular portion 38a fitted in a circular recess 37 formed in one end surface of the inner ring 31, and a pair of engaging pieces 38b radially outwardly extending from the respective ends of the circular portion 38a and inserted through a cutout 39 formed in the outer peripheral wall of the inner ring defining the recess 37 and a cutout 40 formed in the end surface of the retainer 36. The engaging pieces 38b thus bias the respective circumferentially opposed end surfaces of the cutouts 39 and 40, thereby keeping the retainer 36 in the neutral position, where the rollers 35 are not in engagement with the cylindrical surface 33 and the cam surfaces 34.

As shown in FIG. 4, the inner rings 31 mounted in the first-speed output gear 23b and the second-speed output gear 24b, respectively, are sandwiched between a spacer 41 mounted between the inner rings 31 and one and the other of two stopper rings 44 fitted on the output shaft 22, respectively, so as to be axially immovable. The spacer 41 is fixed to both of the inner rings 31 so as to rotate together with the inner rings 31.

The inner rings 31 have cylindrical bearing fitting surfaces 42 at their axial end portions facing the respective stopper rings 44. Bearings 43 are fitted on the bearing fitting surfaces 42, supporting the first-speed output gear 23b and the second-speed output gear 24b so as to be rotatable relative to the respective inner rings 31.

Either one of the first-speed two-way roller clutch 30A and the second-speed two-way roller clutch 30B can be selectively engaged by a shifting actuator 50 shown in FIGS. 4 and 7-9.

The shifting actuator 50 includes a shift ring 51 fitted around the spacer 41, a first-speed friction plate 52a fitted around the spacer 41 on one side of the shift ring 51, and a second-speed friction plate 52b fitted around the spacer 41 on the other side of the shift ring 51. The first-speed friction plate 52a is rotationally fixed to the retainer 36 of the first-speed two-way roller clutch 30A. The second-speed friction plate 52b is rotationally fixed to the retainer 36 of the second-speed two-way roller clutch 30B.

Figure 9:
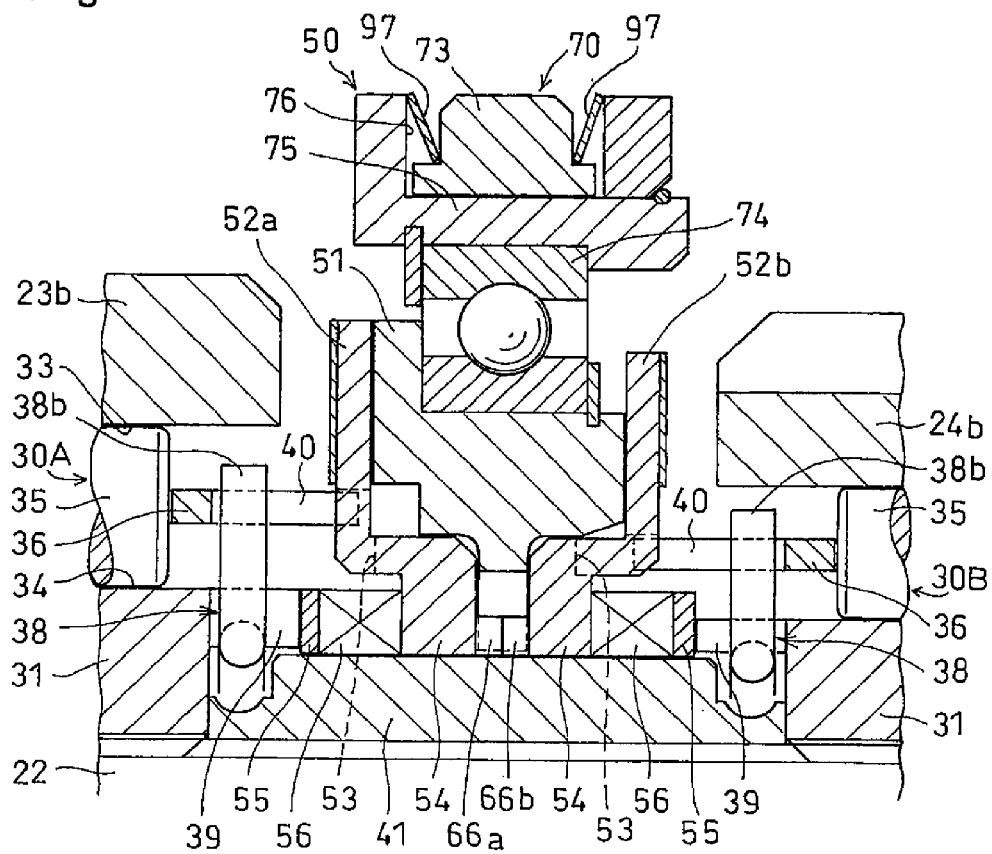
FIG. 9 is an enlarged sectional view of a portion of FIG. 4.

As shown in FIG. 9, the first-speed friction plate 52a is disposed between the shift ring 51 and the first-speed output gear 23b so as to be axially movable into and out of contact with the side of the first-speed output gear 23b. Similarly, the second-speed friction plate 52b is disposed between the shift ring 51 and the second-speed output gear 24b so as to be axially movable into and out of contact with the side of the second-speed output gear 24b. The shift ring 51 is supported so as to be axially movable between a first-speed shift position SP1f shown in FIG. 11, where the first-speed friction plate 52a is pressed against the side of the first-speed output gear 23b by the shift ring 51 and a second-speed shift position SP2f shown in FIG. 13, where the second-speed friction plate 52b is pressed against the side of the second-speed output gear 24b by the shift ring 51.

Figure 11:
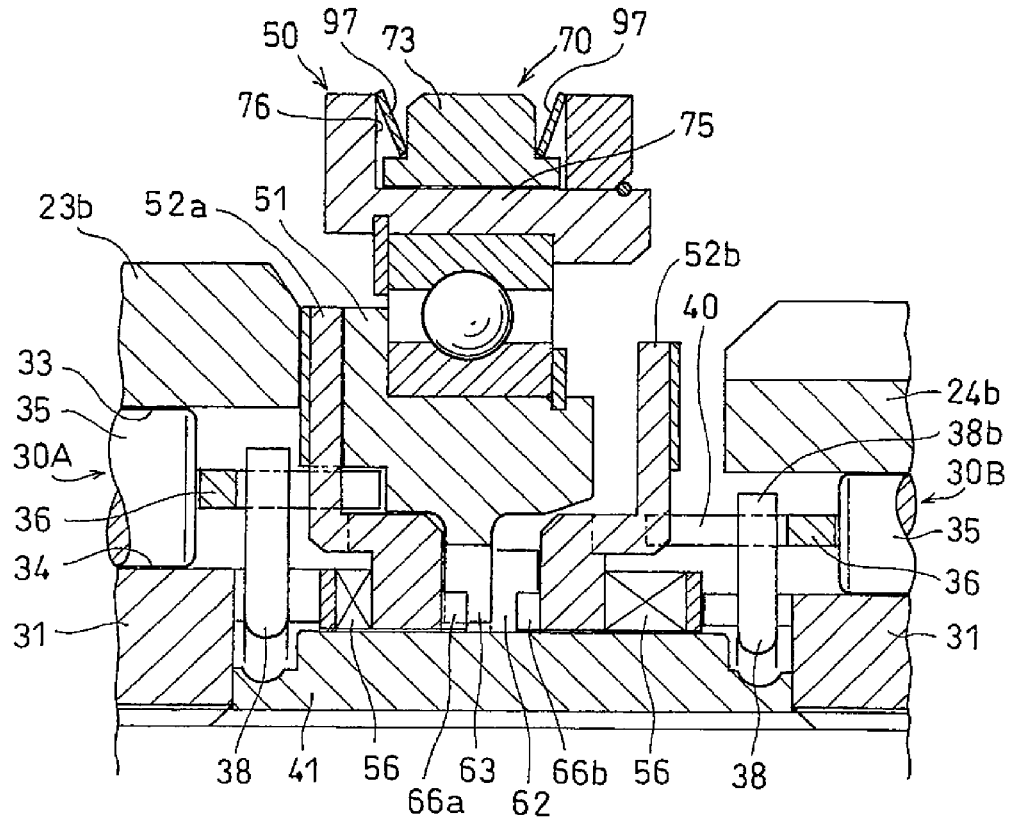
FIG. 11 is a sectional view showing a shift position corresponding to a first speed reduction ratio.

As shown in FIG. 11, when the shift ring 51 of the shifting actuator 50 is moved by a shift mechanism 70 toward the first-speed output gear 23b until the first-speed friction plate 52a is pressed against and brought into frictional engagement with the side of the first-speed output gear 23b, the retainer 36 on the first-speed side is coupled to the first-speed output gear 23b, so that the retainer 36 on the first-speed side rotates relative to the inner ring 31. This brings the rollers 35 on the first-speed side into engagement with the cylindrical surface 33 and the cam surfaces 34.

Figure 13:
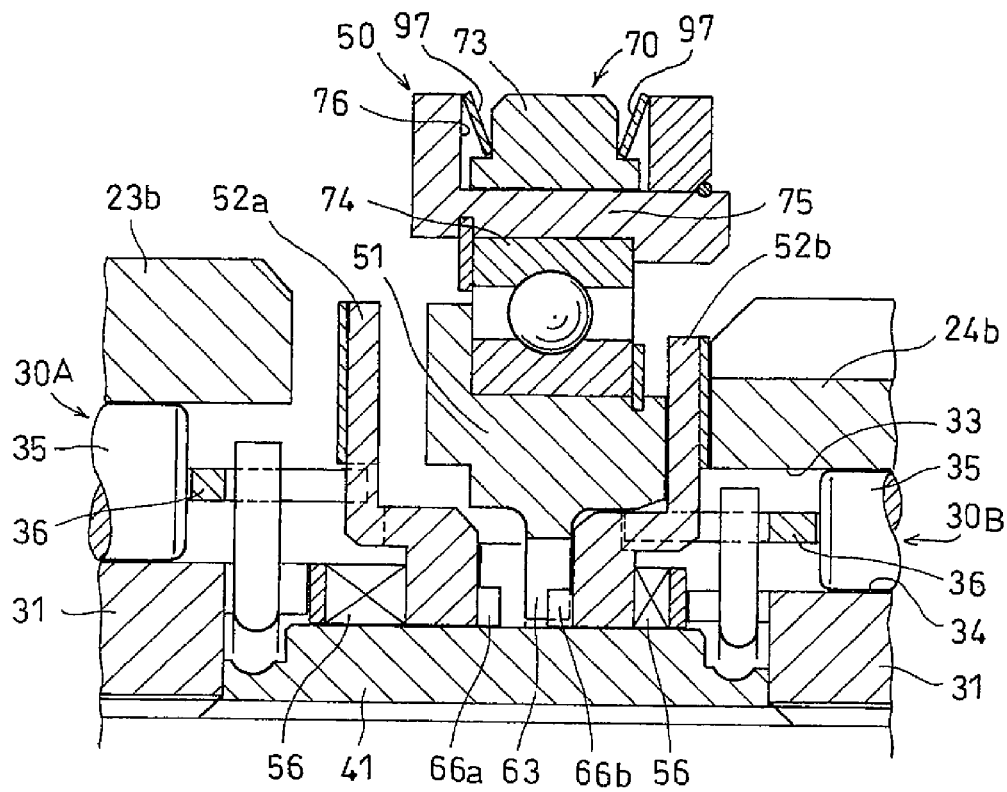
FIG. 13 is a sectional view showing a shift position corresponding to a second speed reduction ratio.

When, as shown in FIG. 13, the shift ring 51 of the shifting actuator 50 is moved by the shift mechanism 70 toward the second-speed output gear 24b until the second-speed friction plate 52b is pressed against and brought into frictional engagement with the side of the second-speed output gear 24b, the retainer 36 on the second-speed side is coupled to the second-speed output gear 24b, so that the retainer 36 on the second-speed side rotates relative to the inner ring 31, engaging the rollers 35 on the second-speed side.

Figure 15:
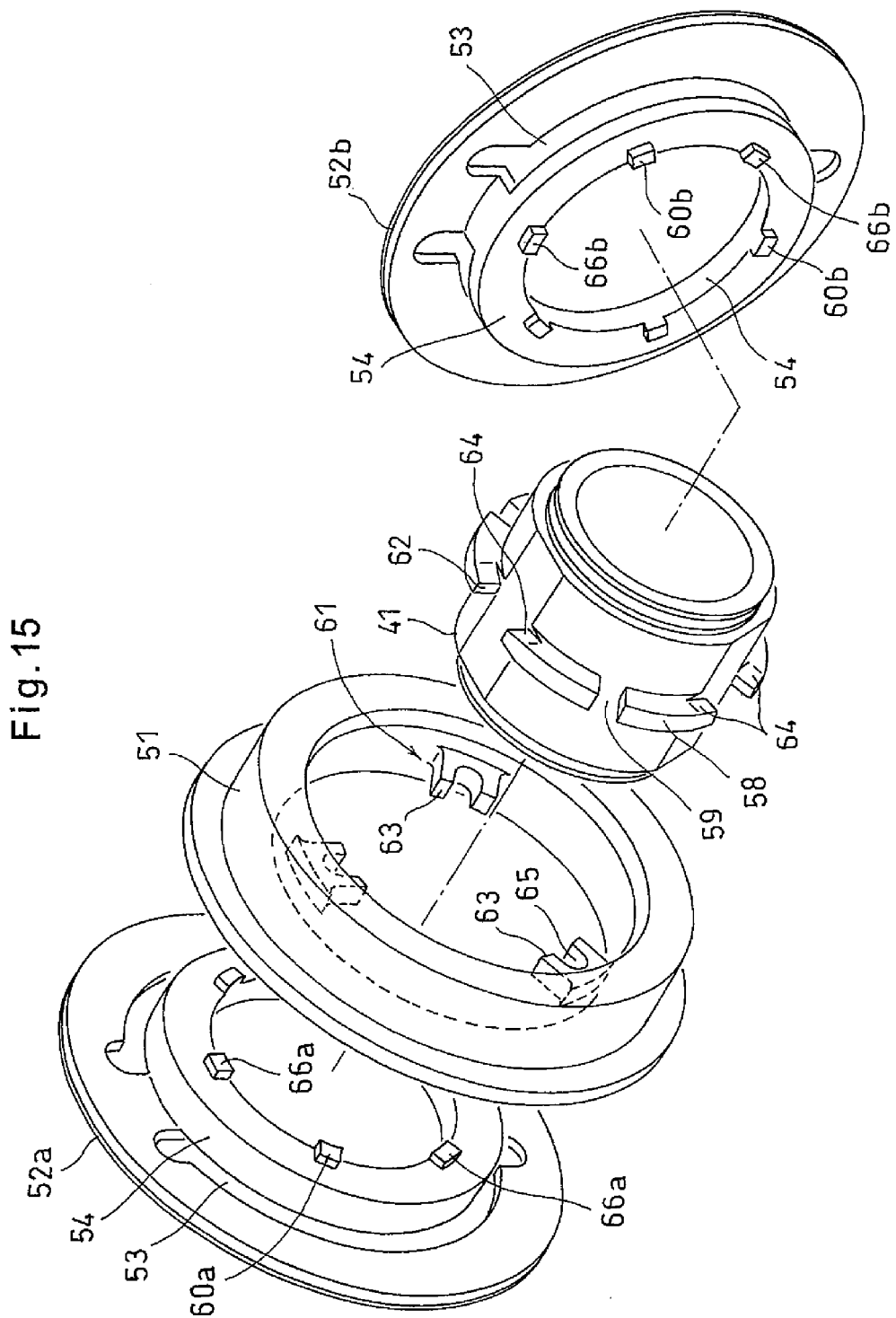
FIG. 15 is an exploded perspective view of the shift mechanism, showing its spacer, friction plates and shift ring.

As shown in FIGS. 9 and 15, the first-speed friction plate 52a and the second-speed friction plate 52b are formed with a circular arc-shaped groove 53 in which the end portion of the retainer 36 formed with the cutout 40 is engaged, thereby rotationally fixing the first-speed friction plate 52a and the second-speed friction plate 52b relative to the respective retainers 36.

The first-speed friction plate 52a has a boss portion 54 on its radially inner portion which protrudes toward the axially opposed second-speed friction plate 52b. A washer 55 and a separation spring 56 are mounted between the boss portion 54 and the inner ring 31 on the first-speed side. The separation spring 56 biases the first-speed friction plate 52a in the direction away from the side of the first-speed output gear 23b.

Similarly, the second-speed friction plate 52b has a boss portion 54 on its radially inner portion which protrudes toward the first-speed friction plate 52a, with a washer 55 and a separation spring 56 mounted between the boss portion 54 and the inner ring 31 on the second-speed side such that the separation spring 56 biases the second-speed friction plate 52b in the direction away from the side of the second-speed output gear 24b.

Figure 7:
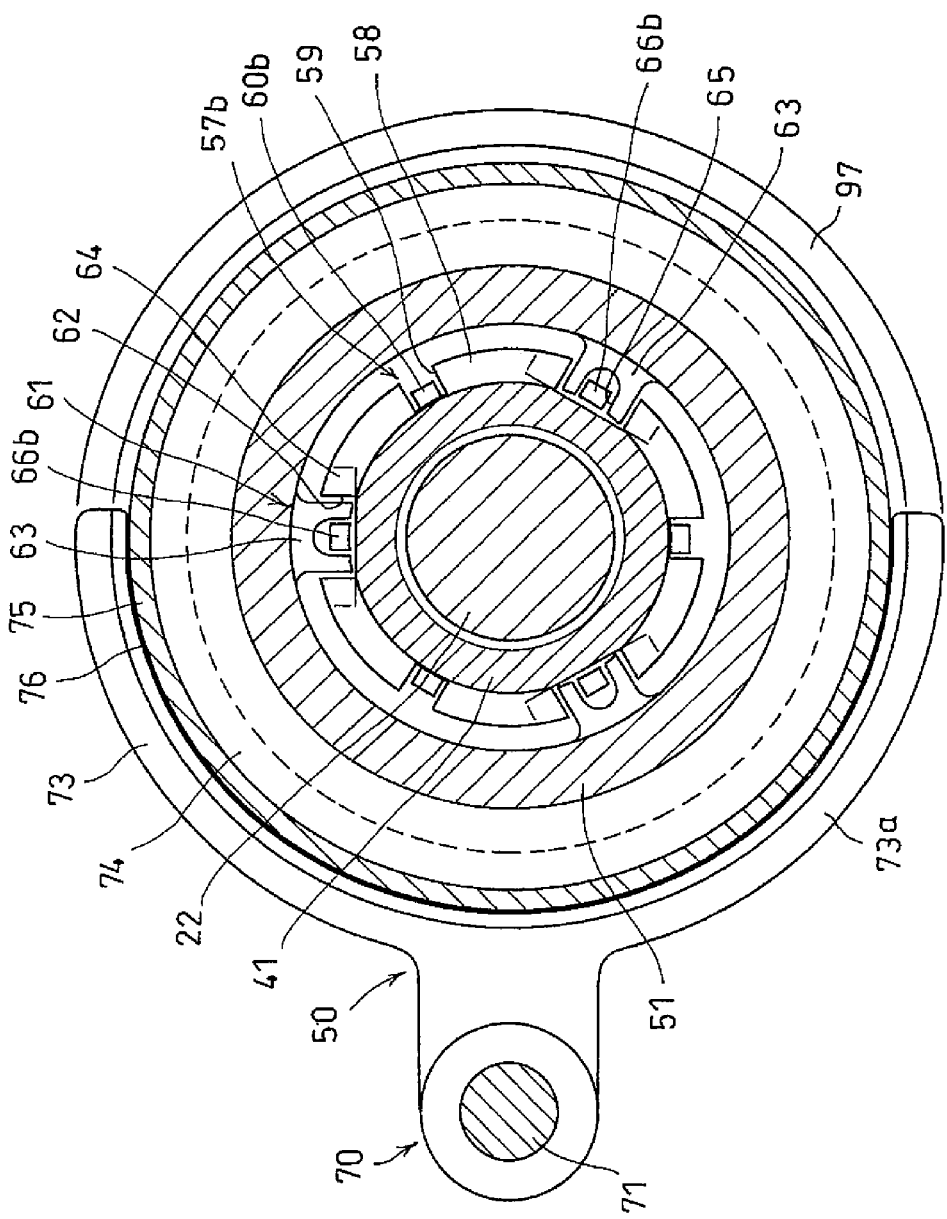
FIG. 7 is a sectional view taken along line VII-VII of FIG. 4.

As shown in FIGS. 7 and 9, a first anti-rotation means 57a for preventing rotation of the first-speed friction plate 52a is provided between the first-speed friction plate 52a and the output shaft 22. The first anti-rotation means 57a includes a plurality of anti-rotation protrusions 60a formed on the boss portion 54 of the first-speed friction plate 52a so as to be engageable in respective circumferentially spaced apart anti-rotation grooves 59 formed in a circumferentially extending annular protrusion 58 formed on the outer periphery of the spacer 41, which is integral with the output shaft 22.

Figure 10:
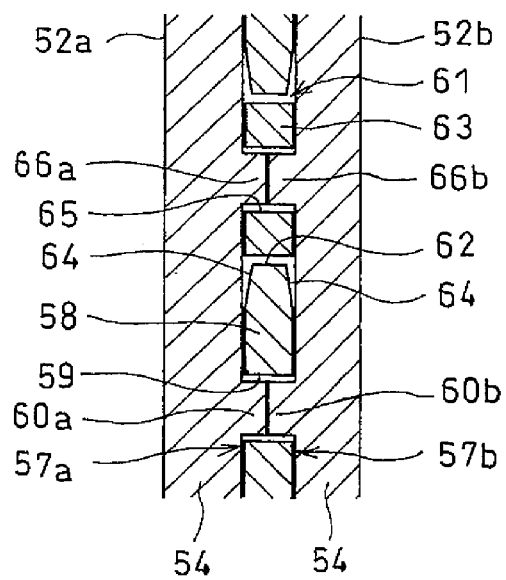
FIG. 10 is a sectional view of an anti-rotation portion which prevents relative rotation between friction plates and a shift ring.
Figure 12:
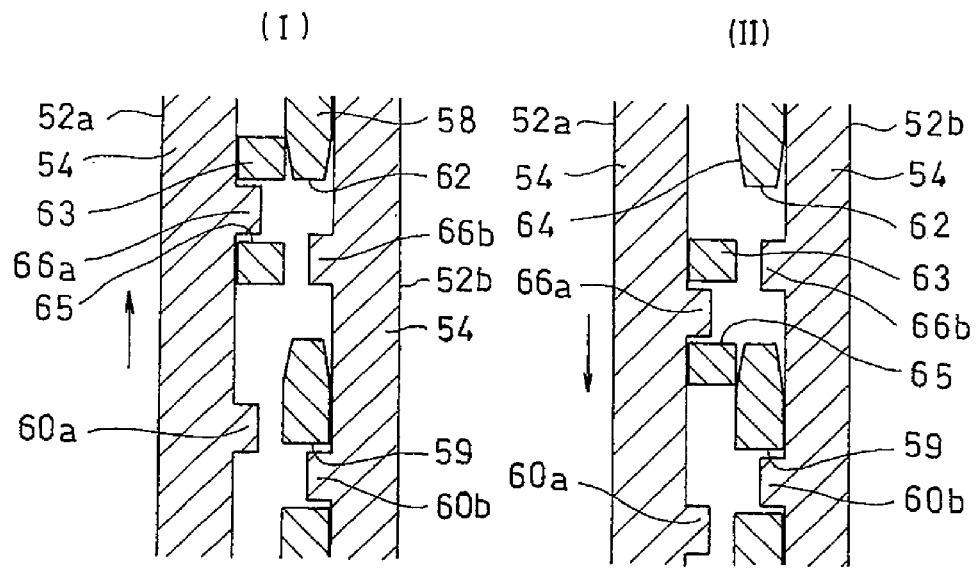

As shown in FIGS. 9 and 10, while the first-speed friction plate 52a is apart from the side of the first-speed output gear 23b, the anti-rotation protrusions 60a are configured to be engaged in the respective anti-rotation grooves 59, thereby rotationally fixing the first friction plate 52a to the output shaft 22 through the spacer 41. In this state, the retainer 36 on the first-speed side, which is rotationally fixed to the first-speed friction plate 52a, is kept in the neutral position. As shown in FIGS. 11 and 12, while the first-speed friction plate 52a is in contact with the side of the first-speed output gear 23b, the anti-rotation protrusions 60a are disengaged from the anti-rotation grooves 59, so that the first-speed friction plate 52a is rotatable relative to the output shaft 22.

A second anti-rotation means 57b for preventing rotation of the second-speed friction plate 52b is provided between the second-speed friction plate 52b and the output shaft 22. Similar to the first anti-rotation means 57a, the second anti-rotation means 57b includes a plurality of anti-rotation protrusions 60b formed on the boss portion 54 of the second-speed friction plate 52b and engageable in the respective anti-rotation grooves 59.

A third anti-rotation means 61 for preventing rotation of the shift ring 51 is provided between the shift ring 51 and the output shaft 22. The third anti-rotation means 61 includes cutouts 62 formed in the annular protrusion 58 on the outer periphery of the spacer 41 and each having a larger circumferential width than the anti-rotation grooves 59, and projections 63 formed on the inner periphery of the shift ring 51.

Figure 14:
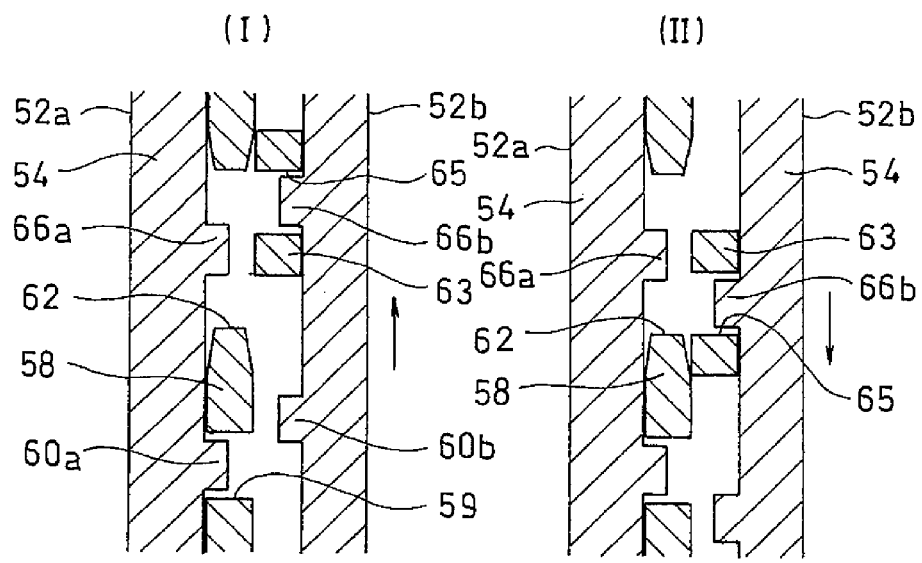

As shown in FIGS. 9 and 10, the projections 63 and the cutouts 62 are configured such that while the shift ring 51 is in its neutral position between the first-speed shift position SP1f and the second-speed shift position SP2f, the projections 63 are engaged in the respective cutouts 62. In this state, the inner surfaces of the cutouts 62 restrict the circumferential movement of the projections 63, thereby rotationally fixing the shift ring 51 to the output shaft 22 through the spacer 41. Also in this state, since the retainers 36 on the first- and second-speed sides are both rotationally fixed to the shift ring 51 through the first- and second-speed friction plates 52a and 52b, respectively, both retainers 36 are kept in the neutral position. As shown in FIGS. 12 and 14, when the shift ring 51 is in the first-speed shift position SP1f or the second-speed shift position SP2f, the projections 63 are out of the cutouts 62, so that the shift ring 51 is rotatable relative to the output shaft 22.

The cutouts 62 of the annular protrusion 58 axially extend through the annular protrusion 58 and each have a circumferential width large enough that the projections 63 can pass therethrough in the axial direction. Thus, with the projections 63 axially aligned with the respective cutouts 62 of the annular protrusion 58, the projections 63 can be axially moved through the cutouts 62 such that the shift ring 51 is axially moved between the first-speed shift position SP1f and the second-speed shift position SP2f. On the other hand, while the projections 63 are both axially and circumferentially displaced from the cutouts 62 of the annular protrusion 58, the projections 63 interfere with the annular protrusion 58, thereby preventing axial movement of the shift ring 51 between the first-speed shift position SP1f and the second-speed shift position SP2f.

Figure 8:
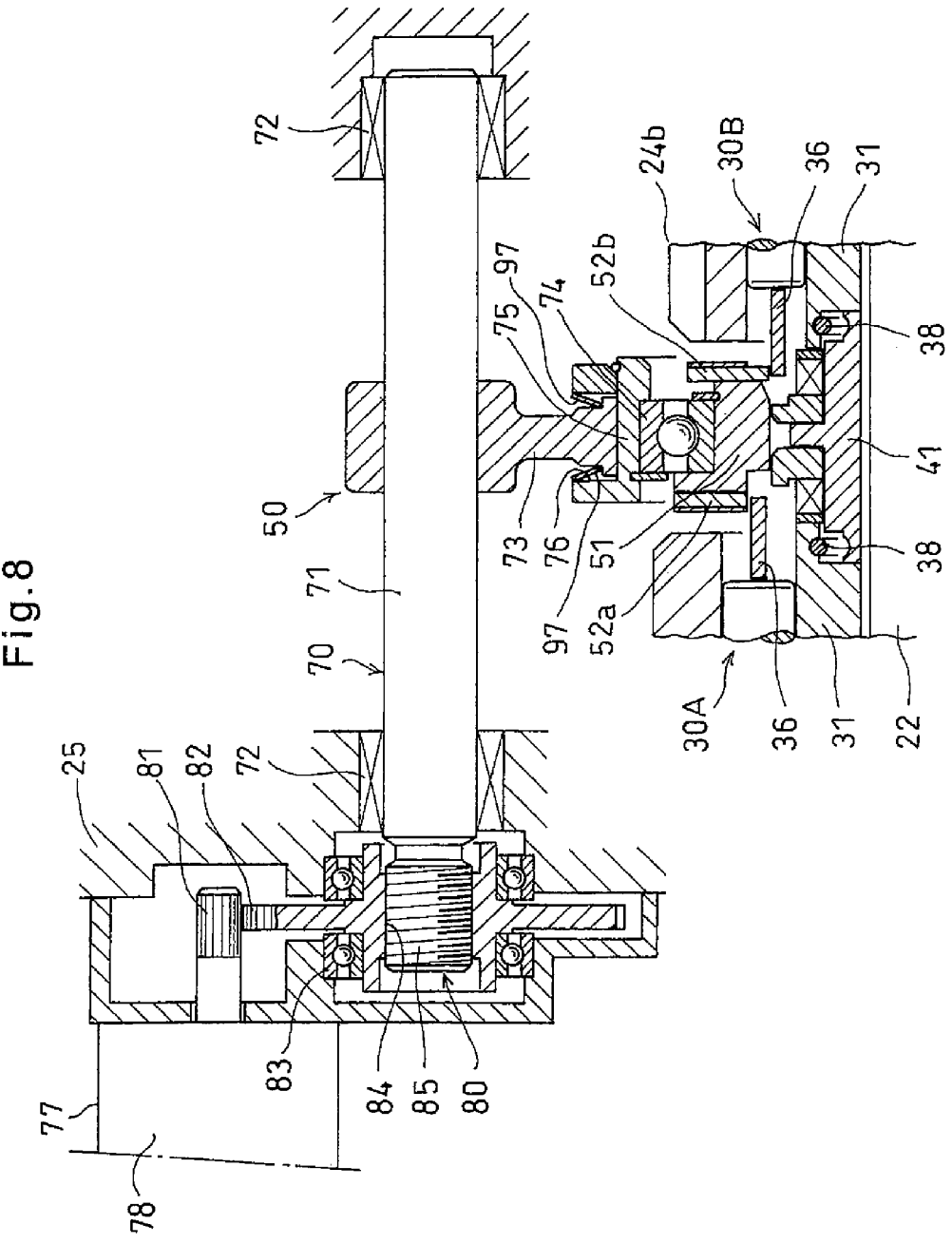
FIG. 8 is a sectional view showing a shift mechanism.

As shown in FIGS. 8 and 15, the projections 63 each have bifurcated end portions. The boss portion 54 of the first-speed friction plate 52a has first engaging protrusions 66a at positions corresponding to the positions of engaging recesses 65 defined between the bifurcated end portions of the respective projections 63. As shown in FIGS. 11 and 12, while the shift ring 51 is in the first-speed shift position SP1f, the first engaging protrusions 66a are engaged in the respective engaging recesses 65, thereby preventing rotation of the shift ring 51 relative to the first-speed friction plate 52a. As shown in FIGS. 13 and 14, while the shift ring 51 is in the second-speed shift position SP2f, the first engaging protrusions 66a are not engaged in the engaging recesses 65, so that the shift ring 51 can rotate relative to the first-speed friction plate 52a.

Similarly, the boss portion 54 of the second-speed friction plate 52a has second engaging protrusions 66b at positions corresponding to the positions of the engaging recesses 65 of the respective projections 63. As shown in FIGS. 13 and 14, while the shift ring 51 is in the second-speed shift position SP2f, the second engaging protrusions 66b are engaged in the respective engaging recesses 65, thereby preventing rotation of the shift ring 51 relative to the second-speed friction plate 52b. As shown in FIGS. 11 and 12, while the shift ring 51 is in the first-speed shift position SP1f, the second engaging protrusions 66b are not engaged in the engaging recesses 65, so that the shift ring 51 can rotate relative to the second-speed friction plate 52b.

The annular protrusion 58 has tapered surfaces 64 on both axial end surfaces thereof and on both circumferential sides of the respective cutouts 62. The tapered surfaces 64 are inclined toward the respective cutouts 62 at an angle of 5 to 30° relative to the circumferential direction. When the projections 63 contact respective tapered surfaces 64, the projections 63 are guided into the respective cutouts 62 under the circumferential component force produced at the contact surfaces.

As shown in FIGS. 7 and 8, the shift mechanism 70 includes a shift rod 71 extending parallel to the output shaft 22 and slidably supported by a pair of slide bearings 72 mounted to a housing 25, a shift fork 73 mounted on the shift rod 71, and a shift sleeve 75 rotatably but axially immovably supported by a rolling bearing 74 fitted on the outer periphery of the shift ring 51. The shift fork 73 has bifurcated end portions 73a fitted in an annular groove 76 formed in the outer periphery of the shift sleeve 75. Preload springs 97 are disposed in axial gaps defined between the bifurcated end portions 73a and the respective side walls of the annular groove 76, thereby applying an axial biasing force to the shift sleeve and the shift fork 73. An actuator 77 can axially move the shift rod 71, thereby axially moving the shift ring 51 together with the shift sleeve 75. The force with which the shift ring 51 is pressed against either of the first-speed friction plate 52a and the second-speed friction plate 52b is determined by the axial position of the shift fork 73 relative to the shift sleeve 75.

The actuator 77 according to the present invention may be a cylinder or a solenoid connected to the shift rod 71. But the actuator 77 shown includes a motor 78, and a motion converter mechanism 80 configured to convert the rotation of the output shaft 79 of the motor to axial movement of the shift rod 71.

The motion converter mechanism 80 includes a drive gear 81 mounted on the output shaft 79 of the motor 78, and an idler gear 82 in the form of a nut meshing with the drive gear 81 and rotatably supported by a opposed pair of bearings 83. The idler gear 82 has an internal thread 84 formed on the inner periphery thereof which meshes with an external thread 85 formed on the outer periphery of the shift rod 71 at its end portion such that the rotation of the idler gear 82, which is axially immovable, is converted to axial movement of the shift rod 71.

As shown in FIG. 3, an output gear 86 is mounted on the output shaft 22 at one end portion thereof through which the rotation of the output shaft 22 is transmitted to the differential 90.

The differential 90 includes a differential case 92 rotatably supported by the housing 25, a ring gear 91 mounted to the differential case 92 and meshing with the output gear 86, a pinion shaft 93 having both end portions thereof rotatably supported by the differential case 92, a pair of pinions 94 mounted on the pinion shaft 93, and a pair of side gears 95 meshing with the respective pinions 94. Axles 96 have their end portions connected to the respective side gears 95.

Figure 16:
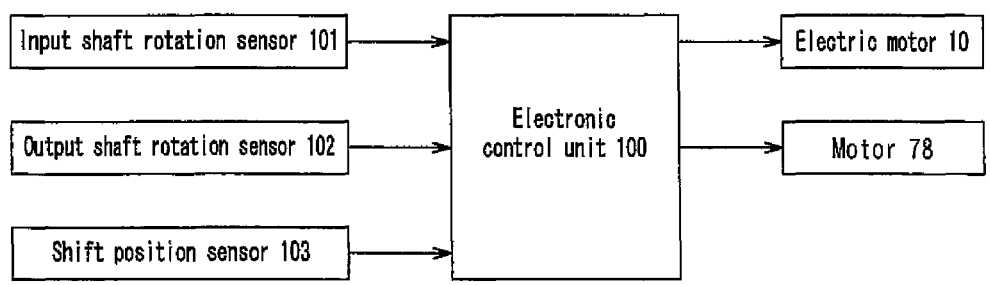
FIG. 16 is a block diagram of an electronic control unit for controlling the motor drive assembly for a vehicle shown in FIG. 3.

An electronic control unit 100 shown in FIG. 16 produces a control signal for controlling the torque produced from the electric motor 10. The electric control unit 100 receives a signal indicative of the rotational speed of the input shaft 21 from an input shaft rotational sensor 101, a signal indicative of the rotational speed of the output shaft 22 from an output shaft rotational sensor 102, and a signal indicative of the position of the shift fork 73 from a shift position sensor 103. The shift position sensor 103 may be a potentiometer connected to the shift rod 71. The electronic control unit 100 also produces a control signal for controlling the rotation of the motor 78.

Now the operation of the motor drive assembly A embodying the present invention is described. FIG. 4 shows the state in which the friction plates 52a and 52b are both kept apart from the first-speed output gear 23b and the second-speed output gear 24b, respectively. Thus, the first-speed two-way roller clutch 30A, mounted in the first-speed output gear 23b, and the second-speed two-way roller clutch 30B, mounted in the second-speed output gear 24b, are both disengaged, as shown in FIG. 5.

In this state, when the input shaft 21 is rotated by the electric motor 10, shown in FIG. 3, its rotation is transmitted only up to the first- and second-speed output gears 23b and 24b through the respective first- and second speed input gears 23a and 24a, which mesh with the respective gears 23b and 24b, and thus the rotation of the input shaft 21 is not transmitted to the output shaft 22, with the first-speed output gear 23b and the second-speed output gear 24b idling.

While the first-speed output gear 23b and the second-speed output gear 24b are idling, the respective gears 23b and 24b apply drag torque to the rollers 35 of the respective two-way roller clutches 30A and 30B due to contact with the cylindrical surfaces 33 of the respective gears 23b and 24b, thereby tending to rotate the respective retainers 36 from their neutral position.

But in this state, since the anti-rotation protrusions 60a and 60b are both engaged in the anti-rotation grooves 59, and thus the friction plates 52a and 52b, which are rotationally fixed to respective retainers 36, are both rotationally fixed to the spacer 41, which is in turn fixed to the inner ring 31, drag torque that acts on the rollers 35 can rotate neither of the retainers 36 relative to the inner ring 31, and thus can erroneously engage neither of the first- and second-speed two-way roller clutches 30A and 30B.

While the electric motor 10 is being driven with the first-speed output gear 23b and the second-speed output gear 24b idling, when the motor 78, shown in FIG. 8 is driven to move the shift rod 71 leftwardly in FIG. 8, the shift sleeve 75 and the shift ring 51 are moved leftwardly by the shift fork 73. The first-speed friction plate 52a is thus pressed against the side of the first-speed output gear 23b by the shift ring 51, as shown in FIG. 11.

When the first-speed friction plate 52a is moved to the position shown in FIG. 11, in which the first-speed friction plate 52a is brought into frictional engagement with the side of the first-speed output gear 23b, thus coupling the retainer 36 to the first-speed output gear 23b, while the anti-rotation protrusions 60a disengage from the anti-rotation grooves 59.

In this state, i.e. while the shift ring 51 is in the first-speed shift position SP1f, the first-speed friction plate 52a rotates relative to the output shaft 22 due to frictional force between the side of the first-speed output gear 23b and the surface of the first-speed friction plate 52b in contact with the side of the gear 23b until the retainer 36 on the first-speed side, which is rotationally fixed to the first-speed friction plate 52a, is moved from the neutral position to the engaged position, where the rollers 35 on the first-speed side are wedged into the narrow portions of the wedge spaces defined between the cylindrical surface 33 and the cam surfaces 34, thus engaging the first-speed two-way roller clutch 30A.

The rotation of the first-speed output gear 23b is thus quickly transmitted to the output shaft 22 through the first-speed two-way roller clutch 30A. The rotation of the output shaft 22 is transmitted to the axles 96 through the differential 90.

As a result, if this drive assembly A is used in the electric vehicle EV shown in FIG. 1, the drive assembly A drives the vehicle by driving its front wheels 1. If the drive assembly A is used in the hydraulic vehicle HV shown in FIG. 2, the drive assembly A drives its rear wheels 2, assisting the driving force from the engine, which drives the front wheels 1.

With the first-speed friction plate 52a in frictional engagement with the first-speed output gear 23b, which is formed with the cylindrical surface 33, when the first-speed two-way clutch 30A engages due to the application of torque or due to hard acceleration of the vehicle, the projections 63 are adapted to axially face some of the tapered surfaces 64 formed on the annular protrusion 58 as shown in FIG. 12(I), and when the clutch 30A engages when torque is removed or due to hard deceleration of the vehicle, the projections 63 are adapted to axially face other of the tapered surfaces 64 as shown in FIG. 12(II).

During hard acceleration or deceleration of the vehicle with the first-speed two-way roller clutch 30A engaged, the inertia due to hard acceleration or deceleration tends to wedge the rollers 35 of the second-speed two-way roller clutch 30B into the wedge-shaped spaces. But in this state, since the anti-rotation protrusions 60b are engaged in the anti-rotation grooves 59, the second-speed friction plate 52b is rotationally fixed to the spacer 41, which is in turn fixed to the inner ring 31, so that the inner ring 31 of the second-speed two-way roller clutch 30B cannot rotate relative to the retainer 36 of the clutch 30B, and the second-speed two-way roller clutch 30B remains disengaged.

While the shift ring 51 is in the first-speed shift position SP1f (FIG. 11), since the engaging protrusions 66a of the first-speed friction plate 52a are engaged in the engaging recesses 65, thereby restricting rotation of the shift ring 51 relative to the first-speed friction plate 52a, the shift ring 51 is rotationally fixed to the retainer 36 on the first-speed side through the first-speed friction plate 52a. When, in this state, the retainer 36 on the first-speed side moves from the neutral position to the engaged position, the shift ring 51 rotates together with the retainer 36 on the first-speed side to a position where the projections 63 are circumferentially displaced from the cutouts 62 of the annular protrusion 58. Thus, in this state, i.e. the state in which the retainer 36 on the first-speed side is in the engaged position, it is impossible to axially move the shift ring 51 from the first-speed shift position SP1f to the second-speed shift position SP2f because any such attempt causes the projections 63 to interfere with the annular protrusion 58.

When the shift ring 51 begins to move axially from the first-speed shift position SP1f, shown in FIG. 11, toward the second-speed shift position SP2f, shown in FIG. 13, by actuating the shift mechanism 70, the first-speed two-way roller clutch 30A disengages and the second-speed two-way roller clutch 30B engages, in the following manner.

When the shift mechanism 70 is actuated and the shift fork 73 begins to move from the first-speed side toward the second-speed side, the biasing force of the preload spring 97 on the first-speed side decreases, which in turn reduces the force with which the first-speed friction plate 52a is pressed against the first-speed output gear 23a by the shift ring 51, as well as the friction therebetween. This causes the retainer 36 on the first-speed side to be moved to the neutral position under the biasing force of the switch spring 38, thus disengaging the first-speed two-way roller clutch 30A.

When the shift ring 51 begins to axially move from the first-speed shift position SP1f toward the second-speed shift position SP2f, if the retainer 36 on the first-speed side should fail to move from the engaged position to the neutral position due e.g. to torque transmitted through the first-speed two-way roller clutch 30A, and if the shift ring 51 should axially move to the second-speed shift position SP2f with the retainer 36 on the first-speed side kept in the engaged position, the first-speed two-way roller clutch 30A and the second-speed two-way roller clutch 30B could engage simultaneously. But in the motor drive assembly A according to the present invention, since the projections 63 and the cutouts 62 of the annular protrusion 58 are positioned such that if the retainer 36 on the first-speed side should fail to move from the engaged position to the neutral position, the projections 63 are kept circumferentially displaced from the cutouts 62 and thus interfere with the annular protrusion 58. This prevents the shift ring 51 from moving axially from the first-speed shift position SP1 to the second-speed shift position while the retainer on the first-speed side is in the engaged position, and thus prevents the first-speed two-way roller clutch 30A and the second-speed two-way roller clutch 30B from engaging simultaneously.

On the other hand, if the retainer 36 on the first-speed side moves smoothly from the engaged position to the neutral position simultaneously when the shift ring 51 begins to move axially from the first-speed shift position SP1$f$ toward the second-speed shift position SP2$f$, the shift ring 51 and the first-speed friction plate 52$a$ can rotate together with the retainer 36 on the first-speed side until the projections 63 are axially aligned with the respective cutouts 62 because the first-speed friction plate 52$a$ is rotationally fixed to the retainer 36. This allows the projections 63 to pass through the cutouts 62 and thus the shift ring 51 to axially move between the first-speed shift position SP1$f$ and the second-speed shift position SP2$f$.

When the shift ring 51 reaches the second-speed shift position SP2$f$ as shown in FIG. 13, the second-speed friction plate 52$b$ contacts the side of the second-speed output gear 24$b$, so that the second-speed friction plate 52$b$ rotates relative to the output shaft 22 due to the frictional force between the contact surfaces of the friction plate 52$b$ and the output gear 24$b$. This moves the retainer 36 on the second speed side from the neutral position to the engaged position, thus engaging the second-speed two-way roller clutch 30B. In this state, the rotation of the second-speed output gear 24$b$ is transmitted to the output gear 22 through the second-speed two-way roller clutch 30B, and the rotation of the output shaft 22 is transmitted to the axles 96 through the differential 90.

By axially moving the shift ring 51 from the second-speed shift position SP2$f$ to the first-speed shift position SP1$f$, it is possible to disengage the second-speed two-way roller clutch 30B and engage the first-speed two-way roller clutch 30A in the similar manner as described above.

If torque is being transmitted through the first-speed two-way roller clutch 30A when an attempt is made to disengage the first-speed two-way roller clutch 30A, this torque makes it difficult to disengage the clutch 30A because this torque acts to push the rollers 35 into narrow portions of the wedge-shaped spaces defined between the cylindrical surface 33 and the respective cam surfaces 34. Thus, when the shift mechanism 70 is actuated and the shift ring 51 begins to axially move from the first-speed shift position SP1$f$ toward the second-speed shift position SP2$f$, the first-speed two-way roller clutch 30A could remain engaged even after the first-speed friction plate 52$a$ has been separated from the side of the first-speed output gear 23$b$.

Thus, in order to reliably disengage the first-speed two-way roller clutch 30A, it is necessary not only to separate the first-speed friction plate 52$a$ from the side of the first-speed output gear 23$b$ by actuating the shift mechanism 70, but also to change the torque transmitted between the input shaft 21 and the output shaft 22 by controlling the torque generated from the electric motor 10. Similar control is also necessary to reliably disengage the second-speed two-way roller clutch 30B.

Figure 17:
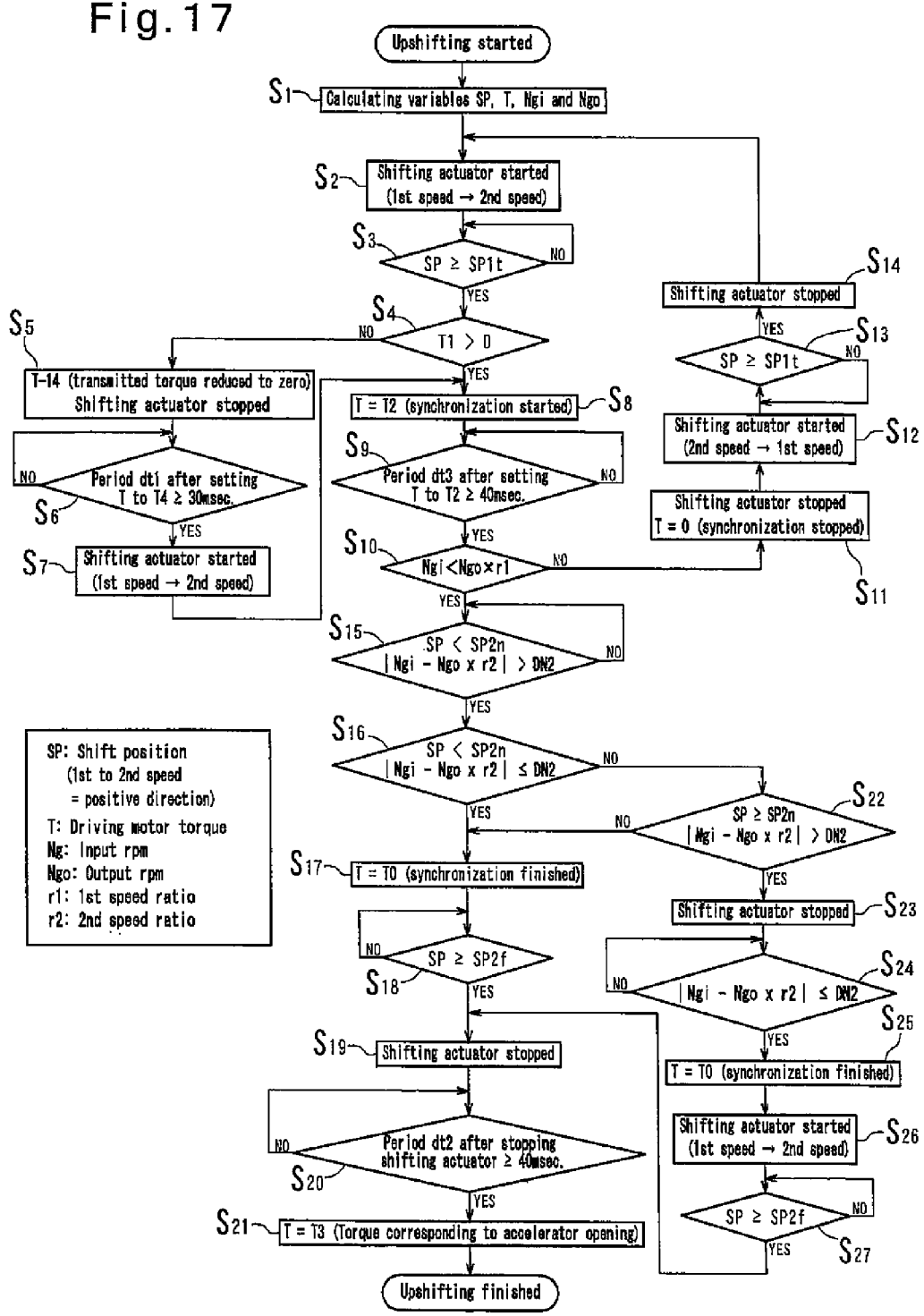
FIG. 17 is a flowchart illustrating the upshifting control by the electronic control unit shown in FIG. 16.
Figure 21:
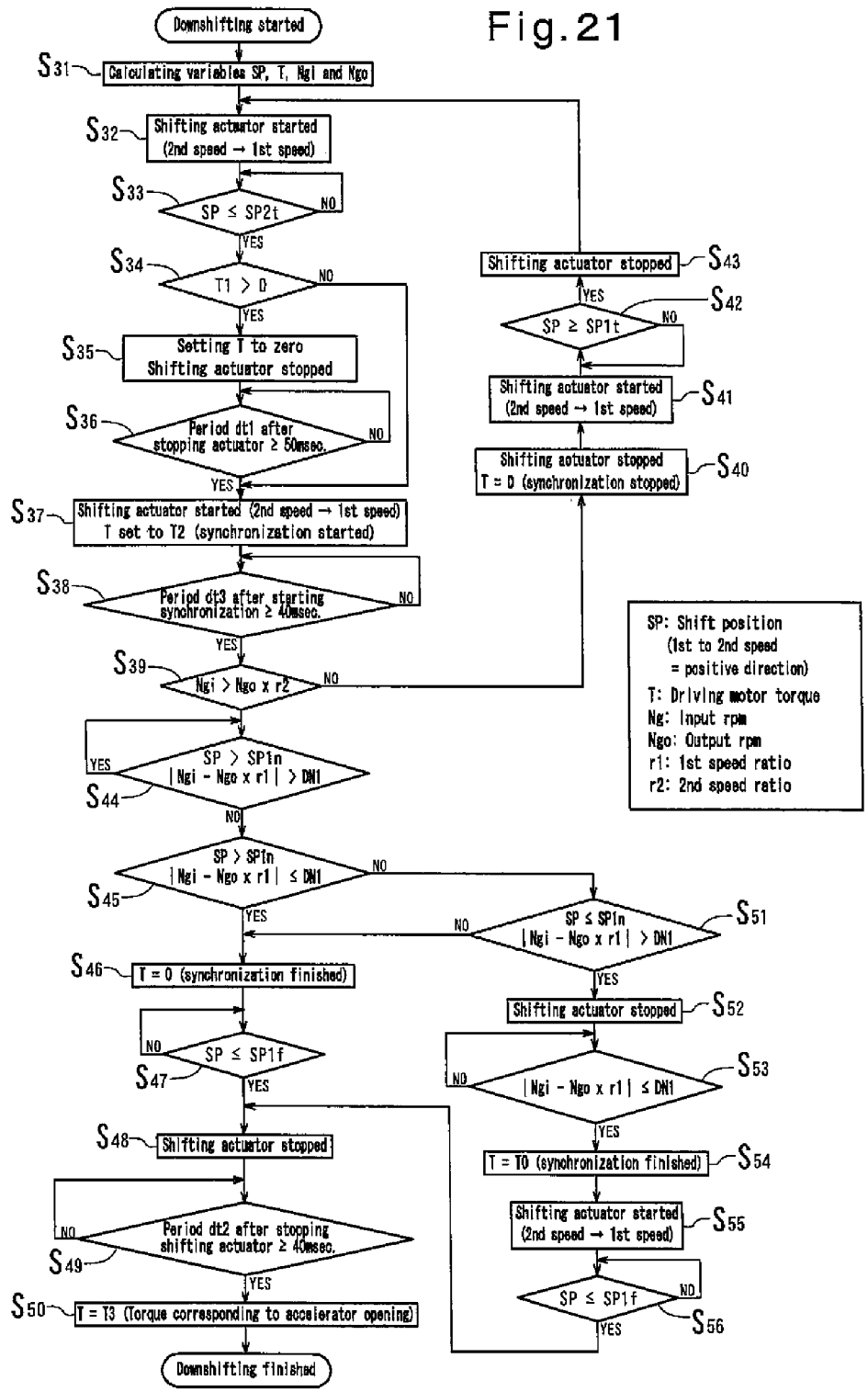
FIG. 21 is a flowchart showing the downshifting control by the electronic control unit shown in FIG. 16.

The electric control unit (ECU) 100 controls the shifting actuator 50, and the torque generated from the electric motor 10 in the manner as shown in FIGS. 17 and 21 so as to reliably disengage the first-speed two-way roller clutch 30A and the second-speed two-way roller clutch 30B, whenever desired.

FIGS. 17 to 20 show this control during upshifting.

When the ECU receives a command to upshift, i.e. a command to disengage the first-speed two-way roller clutch 30A and engage the second-speed two-way roller clutch 30B, the ECU calculates the rotational speed Ngi of the input shaft 21, the rotational speed Ngo of the output shaft 22 and the position SP of the shift ring 51 based on the signals from the input shaft rotational sensor 101, the output shaft rotational sensor 102, and the shift position sensor 103 (Step S1).

Figure 18:
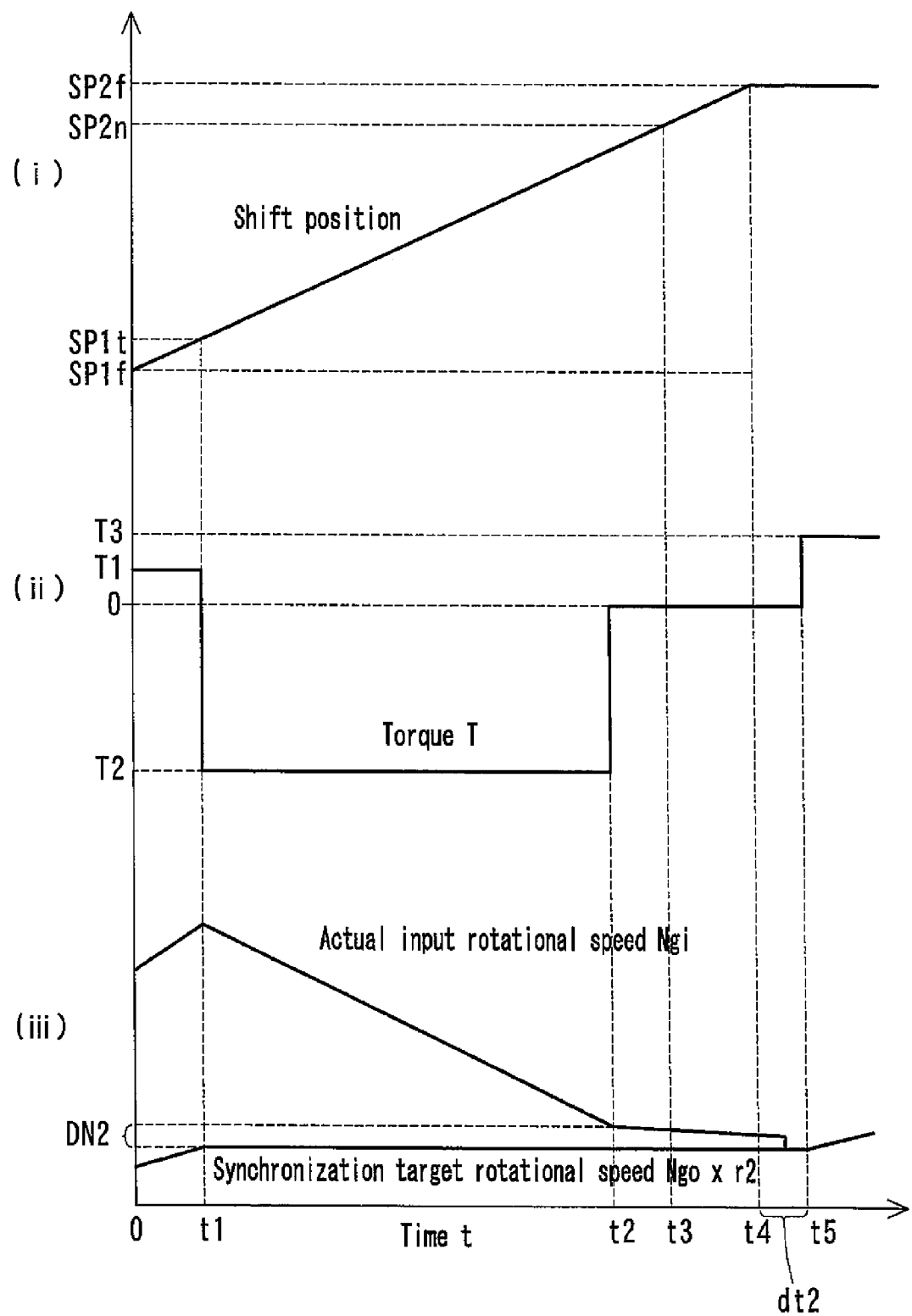
FIG. 18 shows one typical relationship among the shift position during upshifting, the motor torque, and the rotational speeds of the input shaft and the output shaft.
Figure 19:
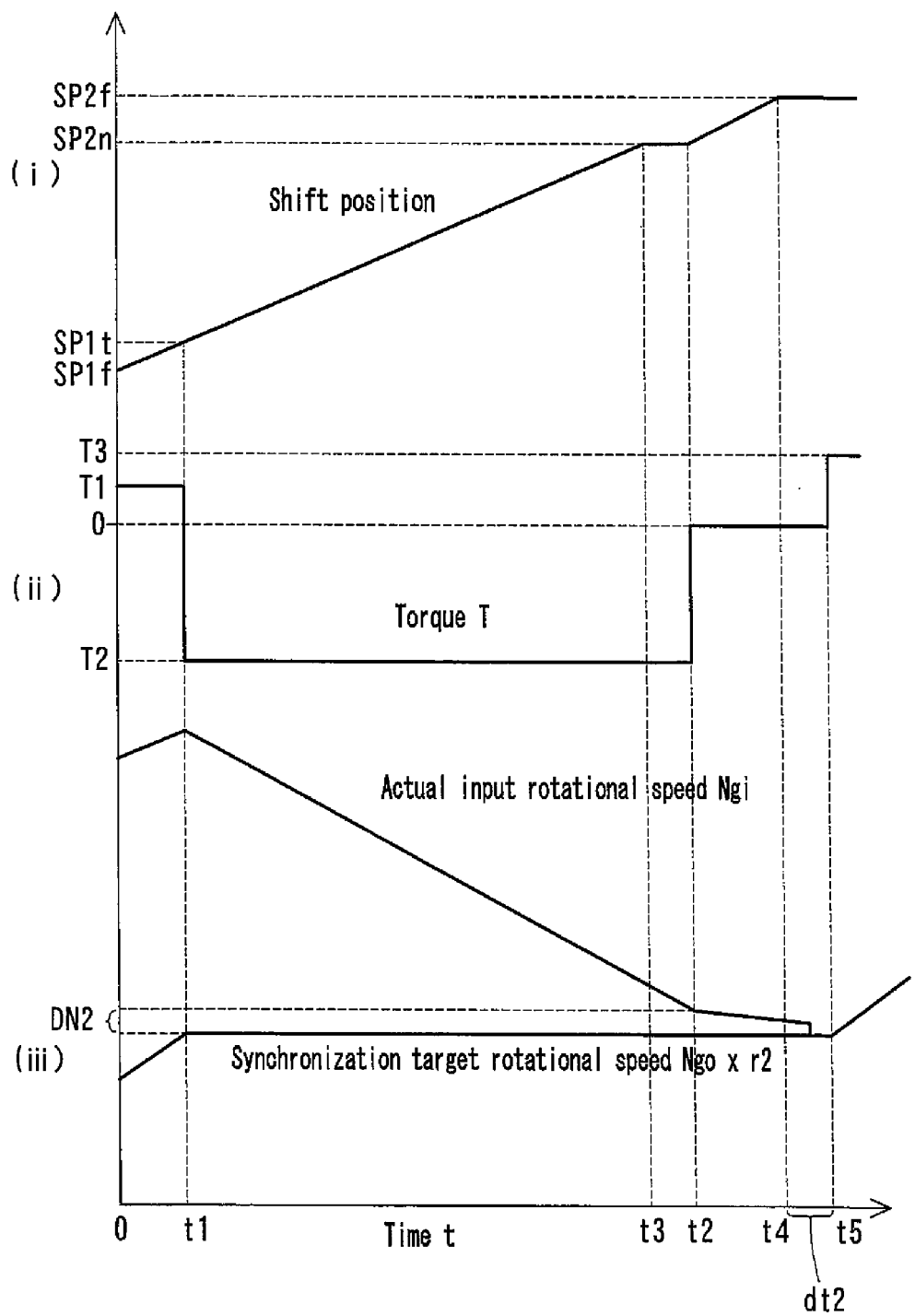
FIG. 19 shows another typical relationship among the shift position during upshifting, the motor torque, and the rotational speeds of the input shaft and the output shaft.
Figure 20:
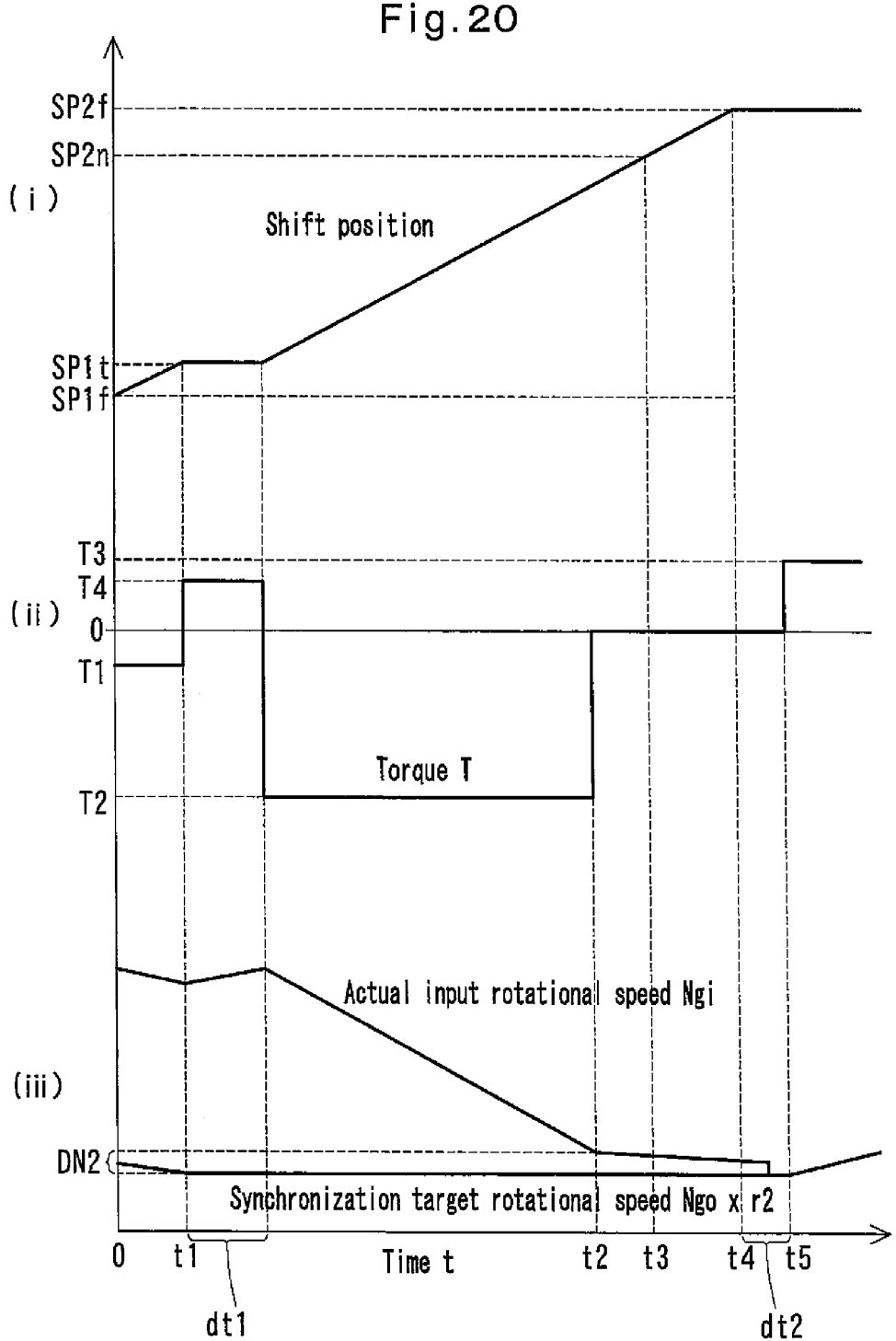
FIG. 20 shows still another typical relationship among the shift position during upshifting, the motor torque, and the rotational speeds of the input shaft and the output shaft.

Then, the ECU actuates the shifting actuator 50 such that the shift ring 51 begins to move from the first-speed shift position SP1$f$ toward the second-speed shift position SP2$f$ during the period from time 0 to t1 show in FIGS. 18 to 20 (Step S2). While the shift ring 51 is moving from the first-speed shift position SP1$f$ toward the second-speed shift position SP2$f$, if torque is being transmitted between the input shaft 21 and the output shaft 22 that tends to accelerate the output shaft 22 from the input shaft 21 (such torque is hereinafter referred to as "torque in the positive direction"), this torque acts to wedge the rollers 35 into narrow portions of the wedge-shaped spaces defined between the cylindrical surface 33 and the respective cam surfaces 34, thereby keeping the first-speed two-way roller clutch 30A engaged even after the friction between the first-speed friction plate 52$a$ and the first-speed output gear 23$b$ disappears.

After Step S2, while the shift ring 51 is moving from the first-speed shift position SP1$f$ toward the second-speed shift position SP2$f$, the ECU determines whether or not the current shift position SP has reached a predetermined first-speed side torque control starting position SP1$t$ (Step S3). The first-speed side torque control starting position SP1$t$ is a position where the first-speed friction plate 52$a$ is in contact with the side of the first-speed output gear 23$b$ but the frictional force therebetween is smaller than the biasing force of the switch spring 38, such as the position corresponding to the position of the shift ring 51 where the projections 63 interfere with the annular protrusion 58 when the shift ring 51 is moved axially from the first-speed shift position SP1$f$ toward the second-speed shift position SP2$f$ with the retainer 36 on the first-speed side in the engaged position.

When the ECU determines that the shift ring 51 has reached the first-speed side torque control starting position SP1$t$ (time t1 in FIGS. 18 to 20), the ECU controls the torque T generated from the electric motor 10 such that the torque transmitted between the input shaft 21 and the output shaft 22 disappears or the torque direction is reversed (Steps S4 to S8).

Specifically, the ECU determines whether the torque T1 is transmitted between the input shaft 21 and the output shaft 22 in the positive direction or negative direction (Step S4), based e.g. on the output current of an inverter for driving the electric motor 10 on the assumption that the driving torque T of the electric motor 10 is the torque transmitted between the input shaft 21 and the output shaft 22. Alternatively, a torque meter mounted in the transmission 20 may be used to determine the direction of the torque T1.

If the ECU determines that the torque T1 being transmitted between the input shaft 21 and the output shaft 22 is in the negative direction (which means that torque is being applied to the output shaft 22 from the output side of the motor drive assembly A that tends to accelerates the output shaft 22, and this torque is being transmitted from the output shaft 22 to the input shaft 21), the ECU controls the electric motor 10 so that the motor 10 generates positive torque T4 which cancels the torque transmitted from the output shaft 22 to the input shaft 21 such that no toque is transmitted between the input shaft 21 and the output shaft 22 at time t1 as shown in FIG. 20 (Step S5). Since no torque is being transmitted between the input shaft 21 and the output shaft 22, the retainer 36 is rotated to the neutral position under the biasing force of the switch spring 38, and the first-speed two-way roller clutch 30A disengages. As used herein, "no torque" is not limited to strictly no torque but may encompass sufficiently small torque that does not prevent the two-way roller clutch 30A from being disengaged under the biasing force of the switch spring 38.

If the direction of the torque T1 being transmitted between the input shaft 21 and the output shaft 22 is in the negative direction, the ECU controls the shifting actuator 50 to temporarily stop the shift ring 51 at the first-speed side torque control starting position SP1*t* at time t1 as shown in FIG. 20, and then after a period of time dt1 has passed which is sufficient for the first-speed two-way roller clutch 30A to be disengaged, the ECU controls the actuator 50 such that the shift ring 51 again begins to move toward the second-speed shift position SP2*f* (Steps S5 to S7). As soon as the shift ring 51 begins to move again, the ECU decelerates the electric motor 10, i.e. controls the motor 10 such that the motor 10 generates negative torque T2 (Step S8) to change the rotational speed Ngi of the input shaft 21 to Ngo×r2, where Ngo is the rotational speed of the output shaft 22 and r2 is the second speed ratio, thereby synchronizing the rotational speed of the input shaft 21 to the rotational speed of the output shaft 22 corresponding to the second speed ratio r2.

If the torque T1 being transmitted between the input shaft 21 and the output shaft 22 is in the positive direction, negative torque T2 is generated from the electric motor 10 to reverse the torque direction transmitted between the input shaft 21 and the output shaft 22 at time t1 as shown in FIG. 18 (Step S8). The thus reversed torque acts to allow the rollers 35 to come out of the narrow portions of the wedge-shaped spaces defined between the cylindrical surface 33 and the respective cam surfaces 34, thereby disengaging the first-speed two-way roller clutch 30A. The negative torque T2 generated from the electric motor 10 also serves to change the rotational speed of the input shaft 21 so as to be synchronized with the rotational speed of the output shaft 22 corresponding to the second-speed ratio r2.

If the torque T1 being transmitted between the input shaft 11 and the output shaft 22 is in the positive direction, the ECU controls the shifting actuator 50 so as to keep moving the shift ring 51 toward the second-speed shift position SP2*f* without temporarily stopping the shift ring 51 at the first-speed side torque control starting position SP1*t* at time t1 as shown in FIG. 18. The negative torque T2 generated from the electric motor 10 is determined such that the synchronization of the rotation of the input shaft with that of the output shaft is completed substantially simultaneously when the shift ring 51 reaches a second-speed side standby position SP2*n*. The second-speed side standby position SP2*n* is a position where the second-speed friction plate 52*b* is not in contact with but sufficiently close to the second-speed output gear 24*b*, or a position where the second-speed friction plate 52*b* is in contact with the second-speed output gear 24*b* such that the frictional force between their contact surfaces is smaller than the biasing force of the switch spring 38.

After the synchronizing operation has begun (Step S8), the ECU waits for a period dt3 which is considered to be a period by the end of which there appears a significant difference between the actual rotational speed Ngi of the input shaft 21 and the rotational speed Ngo×r1 of the input shaft 21 in the first-speed ratio, which is calculated based on the rotational speed Ngo of the output shaft 22 (Step S9), and then the ECU compares the actual rotational speed Ngi of the input shaft 21 with the rotational speed Ngo×r1 of the input shaft. 21 in the first-speed ratio (Step S10).

If no difference is detectable between the above two values in Step S10, this indicates that the first-speed two-way roller clutch 30A has not yet disengaged. Thus, the ECU aborts the synchronizing operation (in Step S11), and controls the shifting actuator 50 so as to return the shift ring 51 to the first-speed shift position SP1*f* and then resume the upshifting operation (Steps S12 to S14) from the beginning.

If a difference is detected between the above two values in Step S10, this indicates that the first-speed two-way roller clutch 30A has successfully disengaged. Thus, the ECU continues the synchronizing operation. After Step S10, the ECU controls the device in different manners depending on whether the shift ring 51 has reached the second-speed side standby position SP2*n* before or after the synchronizing operation has completed. Whether or not the synchronizing operation has completed is determined based on whether or not the difference between the actual rotational speed Ngi of the input shaft 21 and the rotational speed Ngo×r2 of the input shaft 21 in the second speed ratio, which is calculated based on the rotational speed Ngo of the output shaft 22, has decreased to or below a predetermined threshold DN2.

If the synchronizing operation ends (at time t2 shown in FIG. 18) before the shift ring 51 reaches the second-speed side standby position SP2*n* (at time t3 in FIG. 18) (Steps S15 and S16), the ECU controls the shifting actuator 50 such that, as shown in FIG. 18, the shift ring 51 keeps moving toward the second-speed shift position SP2*f* without stopping at the second-speed side standby position SP2*n* (Steps S17 to S19). At this time, the electric motor 10 is controlled to stop generating torque as soon as the synchronizing operation ends (Step S17).

If the synchronizing operation ends (at time t2 shown in FIG. 19) after the shift ring 51 reached the second-speed standby position SP2*n* (at time t3 shown in FIG. 19) (Steps S16 and S22), the shift ring 51 is temporarily stopped at the second-speed side standby position SP2*n* (Step S23) until the synchronizing operation ends (Step S24). As soon as the synchronizing operation ends, the ECU controls the shifting actuator 50 so as to again move the shift ring 51 toward the second-speed shift position SP2*f* (Steps S25 to S27). At this time too, the electric motor 10 is controlled to stop generating torque as soon as the synchronizing operation stops (Step S25).

If the synchronizing operation ends simultaneously when the shift ring 51 reaches the second-speed side standby position SP2*n*, or if the shift ring 51 reaches the second-speed side standby position SP2*n* and the synchronizing operation ends during the above-described period dt3 (Steps S16 and S22), the ECU controls the shifting actuator 50 such that the shift ring 51 keeps moving toward the second-speed shift position SP2*f* without stopping at the second-speed side standby position SP2*n* (Steps S17 to S19).

When the shift ring 51 reaches the second-speed shift position SP2*f* at time t4 shown in any of FIGS. 18 to 20, the ECU deactivates the shifting actuator 50 to stop the shift ring 51 (Step S20), and then controls the electric motor 10 such that the motor 10 generates torque T3 corresponding to the degree of opening of the accelerator (Step S21). The ECU controls the motor 10 such that the motor 10 generates the torque T3 after a period dt2 has passed after the shift ring 51 reached the second-speed shift position SP2*f*, the period dt2 being a period by the end of which the second-speed two-way roller clutch 30B is supposed to engage as a result of contact of the second-speed friction plate 52*b* with the side of the second-speed output gear 24*b* (at time t5 shown in FIGS. 18 to 20). By generating the torque T3 from the motor 10 after the period dt2 has passed, it is possible to minimize the difference in rotational speed between the cam surfaces 34 and the cylindrical surface 33 of the second-speed two-way roller clutch 30B when the rollers 35 engage therebetween, thereby minimizing the shock when the rollers 35 engage.

If the difference in rotational speed between the cam surfaces 34 and the cylindrical surface 33 is extremely small when the shift ring 51 has reached the second-speed shift position SP2f, the second-speed two-way roller clutch 30B may not engage completely by the end of the period dt2. But in such a case, as soon as the electric motor 10 generates torque corresponding to the degree of opening of the accelerator at the end of the period dt2, the second-speed two-way roller clutch 30B engages completely due to a sufficient difference in rotational speed created between the cam surfaces 34 and the cylindrical surface 33.

When upshifting by disengaging the first-speed two-way roller clutch 30A, the torque transmitted between the input shaft 21 and the output shaft 22 is reduced to zero or reversed in direction in the above-described manner. Thus, the torque transmitted between the input shaft 21 and the output shaft 22 does not act to prevent disengagement of the first-speed two-way roller clutch 30A, so that it is possible to reliably disengage the first-speed two-way roller clutch 30A.

Torque is not being transmitted between the input and output shafts during the period from time t1 to time t5 in any of FIGS. 18 to 20. But torque is being transmitted between the input shaft 21 and the output shaft 22 during the period from the time when the shift ring 51 begins to move (time 0) until the shift ring 51 reaches the torque control starting position SP1t (time t1). Thus, with this arrangement, the period during which no torque is being transmitted between the input shaft and the output shaft is shorter than when the torque of the electric motor 10 is controlled so that the torque transmitted between the input shaft 21 and the output shaft 22 decreases to zero as soon as the shift ring 51 begins to move.

According to the present invention, in order to disengage the first-speed two-way roller clutch 30A while torque is being transmitted between the input shaft 21 and the output shaft 22 in the positive direction, the ECU controls the electric motor 10 such that the motor 10 generates negative torque, and thus positively uses the torque transmitted between the input shaft 21 and the output shaft 22 corresponding to the negative torque generated from the motor 10 in disengaging the first-speed two-way roller clutch 30A. With this arrangement, it is possible to more reliably disengage the first-speed two-way roller clutch 30A than when simply reducing the torque generated from the electric motor 10 to zero in an attempt to disengage the first-speed two-way roller clutch 30A. Moreover, the negative torque generated from the electric motor 10 serves to decelerate the input shaft 21, thus shortening the time until the later-stage synchronization is completed.

Also according to the present invention, in order to disengage the first-speed two-way roller clutch 30A while torque is being transmitted between the input shaft 21 and the output shaft 22 in the negative direction, the ECU controls the electric motor 10 such that the motor 10 generates positive torque which can reduce the torque transmitted between the input shaft 21 and the output shaft 22 to zero. With this arrangement, it is possible to disengage the first-speed two-way roller clutch 30A more reliably than when the torque from the electric motor 10 is reduced zero in an attempt to disengage the clutch 30A.

FIGS. 21 to 24 show the downshifting control.

When the ECU receives a command to downshift, i.e. a command to disengage the second-speed two-way roller clutch 30B and engage the first-speed two-way roller clutch 30A, the ECU calculates the rotational speed Ngi of the input shaft 21, the rotational speed Ngo of the output shaft 22 and the position SP of the shift fork 73 based on the signals from the input shaft rotational sensor 101, the output shaft rotational sensor 102, and the shift position sensor 103 (Step S31).

Then, the ECU actuates the shifting actuator 50 such that the shift ring 51 begins to move from the second-speed shift position SP2f toward the first-speed shift position SP1f during the period from time 0 to t1 show in FIGS. 21 to 24 (Step S32). While the shift ring 51 is moving from the second-speed shift position SP2f toward the first-speed shift position SP1f, if torque is being transmitted between the input shaft 21 and the output shaft 22 in the positive direction, this torque acts to wedge the rollers 35 into narrow portions of the wedge-shaped spaces defined between the cylindrical surface 33 and the respective cam surfaces 34, thereby keeping the second-speed two-way roller clutch 30B engaged even after the friction between the second-speed friction plate 52b and the second-speed output gear 24b disappears.

After Step S32, while the shift ring 51 is moving from the second-speed shift position SP2f toward the first-speed shift position SP1f, the ECU determines whether or not the current shift position SP has reached a predetermined second-speed side torque control starting position SP2t (Step S33). The second-speed side torque control starting position SP2t is a position where the second-speed friction plate 52b is in contact with the side of the second-speed output gear 24b but the frictional force therebetween is smaller than the biasing force of the switch spring 38, such as the position corresponding to the position of the shift ring 51 where the projections 63 interfere with the annular protrusion 58 when the shift ring 51 is moved axially from the second-speed shift position SP2f toward the first-speed shift position SP1f with the retainer 36 on the second-speed side in the engaged position.

When the ECU determines that the shift ring 51 has reached the second-speed side torque control starting position SP2t (time t1 in FIGS. 21 to 24), the ECU controls the torque generated from the electric motor 10 such that the torque transmitted between the input shaft 21 and the output shaft 22 disappears or the torque direction is reversed (Steps S34 to S37).

Specifically, the ECU determines whether the torque T1 is transmitted between the input shaft 21 and the output shaft 22 in the positive direction or negative direction (Step S34)

Figure 22:
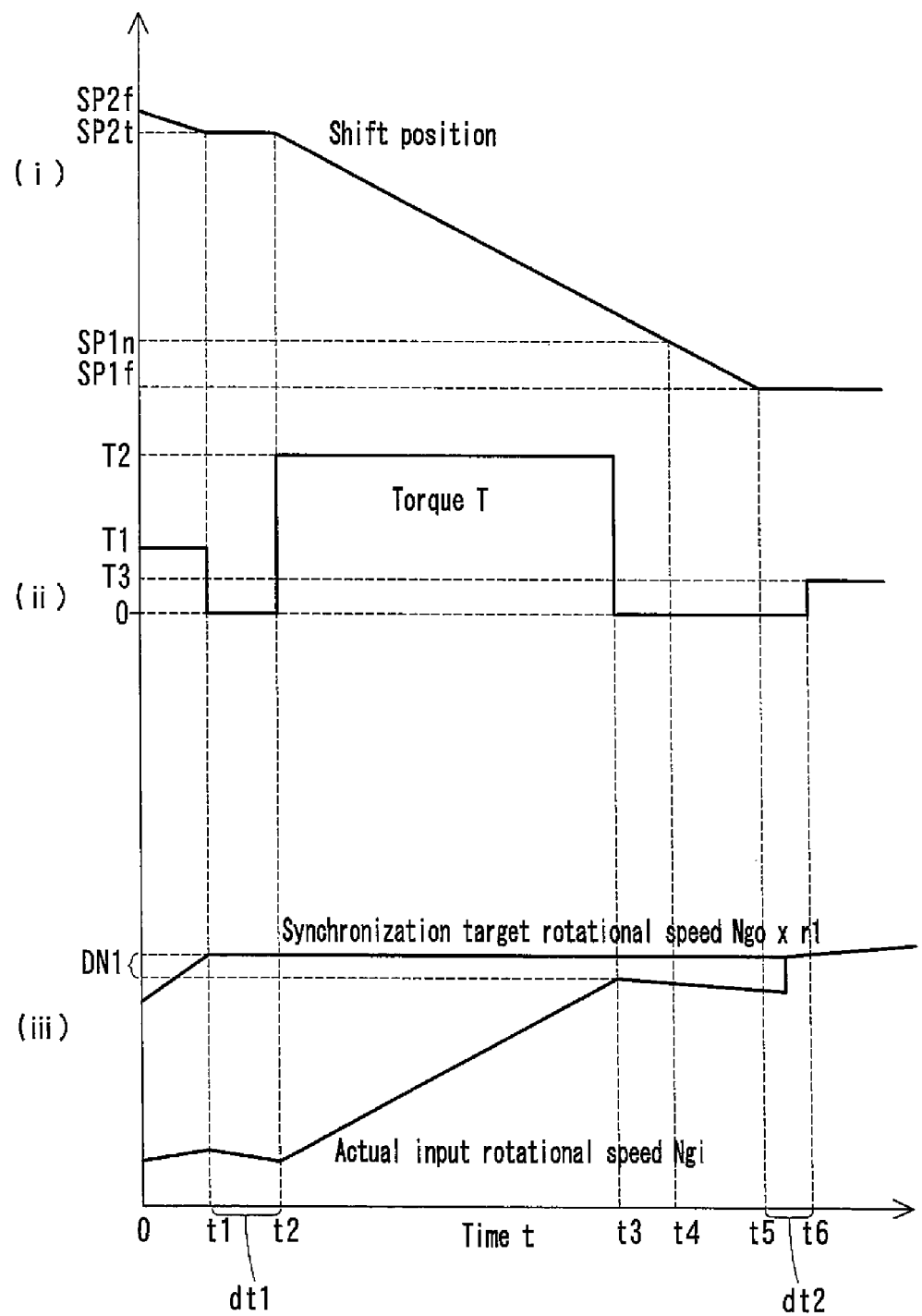
FIG. 22 shows one typical relationship among the shift position during downshifting, the motor torque, and the rotational speeds of the input shaft and the output shaft.
Figure 23:
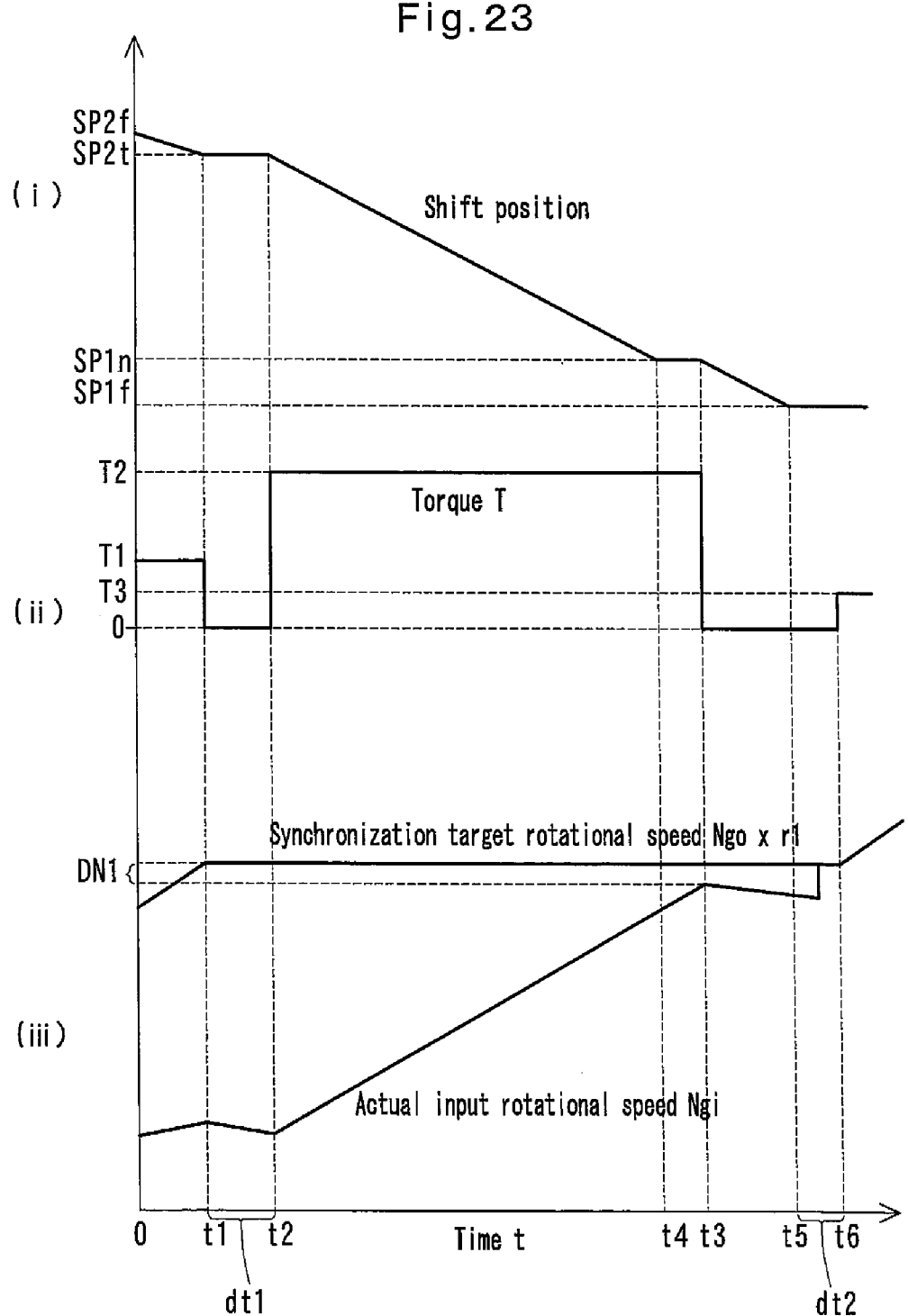
FIG. 23 shows another typical relationship among the shift position during downshifting, the motor torque, and the rotational speeds of the input shaft and the output shaft.

If the ECU determines that the torque T1 being transmitted between the input shaft 21 and the output shaft 22 is in the positive direction, the ECU controls the electric motor 10 so that the motor 10 generates no torque in order to reduce the torque transmitted between the input shaft 21 and the output shaft 22 at time t1 as shown in FIGS. 22 and 23 (Step S35). Since no torque is being transmitted between the input shaft 21 and the output shaft 22, the retainer 36 rotates to the neutral position under the biasing force of the switch spring 38, and the second-speed two-way roller clutch 30B disengages.

If the direction of the torque T1 being transmitted between the input shaft 21 and the output shaft 22 is in the positive direction, the ECU control the shifting actuator 50 to temporarily stop the shift ring 51 at the second-speed side torque control starting position SP2t at time t1 as shown in FIGS. 22 and 23, and then after a period of time dt1 has passed which is sufficient for the second-speed two-way roller clutch 30B to be disengaged, the ECU controls the actuator 50 such that the shift ring 51 again begins to move toward the first-speed shift position SP1f (Steps S35 to S37). As soon as the shift ring 51 begins to move again, the ECU controls the electric motor 10 such that the motor 10 generates positive torque T2 (Step S37) to change the rotational speed Ngi of the input shaft 21 to Ngo×r1, where Ngo is the rotational speed of the output shaft 22 and r1 is the first speed ratio, thereby synchronizing the rotational speed of the input shaft 21 to the rotational speed of the output shaft 22 corresponding to the first speed ratio r1.

If the torque T1 being transmitted between the input shaft 21 and the output shaft 22 is in the negative direction, positive torque T2 is generated from the electric motor 10 to reverse the torque direction transmitted between the input shaft 21 and the output shaft 22 at time t1 as shown in FIG. 24 (Step S37). The thus reversed torque acts to allow the rollers 35 to come out of the narrow portions of the wedge-shaped spaces defined between the cylindrical surface 33 and the respective cam surfaces 34, thereby disengaging the second-speed two-way roller clutch 30B. The positive torque T2 generated from the electric motor 10 also serves to change the rotational speed of the input shaft 21 so as to be synchronized with the rotational speed of the output shaft 22 corresponding to the first-speed ratio r1.

If the torque T1 being transmitted between the input shaft 11 and the output shaft 22 is in the negative direction, the ECU controls the shifting actuator 50 so as to keep moving the shift ring 51 toward the first-speed shift position SP1$f$ without temporarily stopping the shift ring 51 at the second-speed side torque control starting position SP2$t$ at time t1 as shown in FIG. 24. The positive torque T2 generated from the electric motor 10 is determined such that the synchronization of the rotation of the input shaft with that of the output shaft is completed substantially simultaneously when the shift ring 51 reaches a first-speed side standby position SP1$n$. The first-speed side standby position SP1$n$ is a position where the first-speed friction plate 52$a$ is not in contact with but sufficiently close to the first-speed output gear 23$b$, or a position where the first-speed friction plate 52$a$ is in contact with the first-speed output gear 23$b$ such that the frictional force between their contact surfaces is smaller than the biasing force of the switch spring 38.

After the synchronizing operation has begun (Step S37), the ECU waits for a period dt3 which is considered to be a period by the end of which there appears a significant difference between the actual rotational speed Ngi of the input shaft 21 and the rotational speed Ngo×r2 of the input shaft 21 in the second-speed ratio, which is calculated based on the rotational speed Ngo of the output shaft 22 (Step S38), and then the ECU compares the actual rotational speed Ngi of the input shaft 21 with the rotational speed Ngo×r2 of the input shaft 21 in the second-speed ratio (Step S39).

If no difference is detectable between the above two values in Step S39, this indicates that the second-speed two-way roller clutch 30B has not yet disengaged. Thus, the ECU aborts the synchronizing operation (in Step S40), and controls the shifting actuator 50 so as to return the shift ring 51 to the second-speed shift position SP2$f$ and then resume the downshifting operation (Steps S41 to S43) from the beginning.

If a difference is detected between the above two values in Step S39, this indicates that the second-speed two-way roller clutch 30B has successfully disengaged. Thus, the ECU continues the synchronizing operation. After Step S39, the ECU controls the device in different manners depending on whether the shift ring 51 has reached the first-speed side standby position SP1$n$ before or after the synchronizing operation has completed. Whether or not the synchronizing operation has completed is determined based on whether or not the difference between the actual rotational speed Ngi of the input shaft 21 and the rotational speed Ngo×r1 of the input shaft 21 in the first speed ratio, which is calculated based on the rotational speed Ngo of the output shaft 22, has decreased to or below a predetermined threshold DN1.

If the synchronizing operation ends (at time t3 shown in FIG. 22) before the shift ring 51 reaches the first-speed side standby position SP1$n$ (at time t4 in FIG. 22) (Steps S44 and S45), the ECU controls the shifting actuator 50 such that, as shown in FIG. 22, the shift ring 51 keeps moving toward the first-speed shift position SP1$f$ without stopping at the first-speed side standby position SP in (Steps S46 to S48). At this time, the electric motor 10 is controlled to stop generating torque as soon as the synchronizing operation ends (Step S46).

If the synchronizing operation ends (at time t3 shown in FIG. 23) after the shift ring 51 reached the first-speed standby position SP1$n$ (at time t4 shown in FIG. 23) (Steps S46 and S51), the shift ring 51 is temporarily stopped at the first-speed side standby position SP1$n$ (Step S52) until the synchronizing operation ends (Step S53). As soon as the synchronizing operation ends, the ECU controls the shifting actuator 50 so as to again move the shift ring 51 toward the first-speed shift position SP1$f$ (Steps S54 to S56). At this time too, the electric motor 10 is controlled to stop generating torque as soon as the synchronizing operation stops (Step S54).

If the synchronizing operation ends simultaneously when the shift ring 51 reaches the first-speed side standby position SP1$n$, or if the shift ring 51 reaches the first-speed side standby position SP1$n$ and the synchronizing operation ends during the above-described period dt3 (Steps S45 and S51), the ECU controls the shifting actuator 50 such that the shift ring 51 keeps moving toward the first-speed shift position SP1$f$ without stopping at the first-speed side standby position SP1$n$ (Steps S46 to S48).

When the shift ring 51 reaches the first-speed shift position SP1$f$ at time t5 shown in any of FIGS. 22 to 24, the ECU deactivates the shifting actuator 50 to stop the shift ring 51 (Step S49), and then controls the electric motor 10 such that the motor 10 generates torque T3 corresponding to the degree of opening of the accelerator (Step S50). The ECU controls the motor 10 such that the motor 10 generates the torque T3 after a period dt2 has passed after the shift ring 51 reached the first-speed shift position SP1$f$, the period dt2 being a period by the end of which the first-speed two-way roller clutch 30A is supposed to engage as a result of contact of the first-speed friction plate 52$a$ with the side of the first-speed output gear 23$b$ (at time t6 shown in FIGS. 22 to 24). By generating the torque T3 from the motor 10 after the period dt2 has passed, it is possible to minimize the difference in rotational speed between the cam surfaces 34 and the cylindrical surface 33 of the first-speed two-way roller clutch 30A when the rollers 35 engage therebetween, thereby minimizing the shock when the rollers 35 engage.

If the difference in rotational speed between the cam surfaces 34 and the cylindrical surface 33 is extremely small when the shift ring 51 has reached the first-speed shift position SP1$f$, the first-speed two-way roller clutch 30A may not engage completely by the end of the period dt2. But in such a case, as soon as the electric motor 10 generates torque corresponding to the degree of opening of the accelerator at the end of the period dt2, the first-speed two-way roller clutch 30A engages completely due to a sufficient difference in rotational speed created between the cam surfaces 34 and the cylindrical surface 33.

When downshifting by disengaging the second-speed two-way roller clutch 30B, the torque transmitted between the input shaft 21 and the output shaft 22 is reduced to zero or reversed in direction in the above-described manner. Thus, the torque transmitted between the input shaft 21 and the output shaft 23 does not act to prevent disengagement of the second-speed two-way roller clutch 30B, so that it is possible to reliably disengage the second-speed two-way roller clutch 30B.

Torque is not being transmitted between the input and output shafts during the period from time t1 to time t6 in any of FIGS. 22 to 24. But torque is being transmitted between the input shaft 21 and the output shaft 22 during the period from the time when the shift ring 51 begins to move (time 0) until the shift ring 51 reaches the torque control starting position SP2t (time t1). Thus, with this arrangement, the period during which no torque is being transmitted between the input shaft and the output shaft is shorter than when the torque of the electric motor 10 is controlled so that the torque transmitted between the input shaft 21 and the output shaft 22 decreases to zero as soon as the shift ring 51 begins to move.

According to the present invention, in order to disengage the second-speed two-way roller clutch 30B while torque is being transmitted between the input shaft 21 and the output shaft 22 in the negative direction, the ECU controls the electric motor 10 such that the motor 10 generates positive torque, and thus positively uses the torque transmitted between the input shaft 21 and the output shaft 22 corresponding to the positive torque generated from the motor in disengaging the second-speed two-way roller clutch 30B. With this arrangement, it is possible to more reliably disengage the second-speed two-way roller clutch 30B than when simply reducing the torque generated from the electric motor 10 to zero in an attempt to disengage the first-speed two-way roller clutch 30A. Moreover, the positive torque generated from the electric motor 10 serves to accelerate the input shaft 21, thus shortening the time until the later-stage synchronization is completed.

Also according to the present invention, in order to disengage the second-speed two-way roller clutch 30B while torque is being transmitted between the input shaft 21 and the output shaft 22 in the positive direction, the ECU reduces the torque generated from the electric motor 10 to zero. Thus, compared to an arrangement in which negative torque is generated from the electric motor 10 in an attempt to disengage the clutch 30A, it is possible to minimize the degree of deceleration of the input shaft 21 when disengaging the second-speed two-way roller clutch 30B, thereby shortening the time until the later-stage synchronization step is completed.

In the embodiment, the annular protrusion 58 is formed on the spacer 41 rotationally fixed to the inner ring 31. But the spacer 41, which is formed with the annular protrusion 58, may be rotationally fixed directly to the output shaft 22. Also, the annular protrusion 58 may be directly formed on the outer periphery of the output shaft 22.

DESCRIPTION OF THE NUMERALS

1. Front wheel
2. Rear wheel
10. Electric motor
20. Transmission
21. Input shaft
22. Output shaft
23. First-speed gear train
24. Second-speed gear train
30A. First-speed two-way roller clutch
30B. Second-speed two-way roller clutch
31. Inner ring
33. Cylindrical surface
34. Cam surface
35. Roller
36. Retainer
38. Switch spring
50. Shifting actuator
51. Shift ring
52a. First-speed friction plate (friction plate)
52b. Second-speed friction plate (friction plate)
57a. Anti-rotation means for the first-speed friction plate
57b. Anti-rotation means for the second-speed friction plate
58. Annular protrusion
59. Anti-rotation groove
60a, 60b. Anti-rotation protrusion
61. Anti-rotation means for the shift ring
62. Cutout
63. Projection
70. Shift mechanism
71. Shift rod
73. Shift fork
74. Rolling bearing
75. Shift sleeve
77. Actuator
78. Motor
80. Motion converter mechanism
82. Idler gear (nut member)
84. Internal thread
85. External thread
90. Differential

What is claimed is:
1. A motor drive assembly for use in a vehicle, comprising:
an electric motor (10);
an input shaft (21) to which the rotation of the electric motor (10) is transmitted;
a first input gear (23a) and a second input gear (24a) both mounted on the input shaft (21);
a first output gear (23b) and a second output gear (24b) meshing with the first input gear (23a) and the second input gear (24a), respectively;
an output shaft (22) carrying the first output gear (23b) and the second output gear (24b);
a differential (90) through which the rotation of the output shaft (22) is distributed to right and left wheels;
wherein either the first input gear (23a), the second input gear (24a) and the input shaft (21) or the first output gear (23b), the second output gear (24b) and the output shaft (22) constitute a first control gear (23b), a second control gear (24b) and a control gear support shaft (22), respectively, the first and second control gears (23b and 24b) being rotatably supported by the control gear support shaft (22) through respective bearings (43);
a first two-way roller clutch (30A) through which torque can be selectively transmitted between the first control gear (23b) and the control gear support shaft (22);
a second two-way roller clutch (30B) through which torque can be selectively transmitted between the second control gear (24b) and the control gear support shaft (22); and
a shifting actuator (50) for selectively engaging either one of the first two-way roller clutch (30A) and the second two-way roller clutch (30B);
wherein the first two-way roller clutch (30A) comprises a cylindrical surface (33) formed on one of the inner periphery of the first control gear (23b) and the outer periphery of the control gear support shaft (22), cam surfaces (34) formed on the other of the inner periphery of the first control gear (23b) and the outer periphery of the control gear support shaft (22), rollers (35) mounted between the respective cam surfaces (34) and the cylindrical surface (33), a first retainer (36) retaining the rollers (35) and rotatable relative to the control gear support shaft (22) between an engaging position where the rollers (35) are engaged between the respective cam surfaces (34) and the cylindrical surface (33) and a neutral position where the rollers (35) are not engaged, and a first switch spring (38) elastically biasing the first retainer (36) toward the neutral position;

wherein the second two-way roller clutch (30B) comprises a cylindrical surface (33) formed on one of the inner periphery of the second control gear (24b) and the outer periphery of the control gear support shaft (22), cam surfaces (34) formed on the other of the inner periphery of the second control gear (24b) and the outer periphery of the control gear support shaft (22), rollers (35) mounted between the respective cam surfaces (34) and the cylindrical surface (33), a second retainer (36) retaining the rollers (35) and rotatable relative to the control gear support shaft (22) between an engaging position where the rollers (35) are engaged between the respective cam surfaces (34) and the cylindrical surface (33) and a neutral position where the rollers (35) are not engaged, and a second switch spring (38) elastically biasing the second retainer (36) toward the neutral position;

wherein the shifting actuator (50) comprises a first friction plate (52a) rotationally fixed to the first retainer (36) and axially movable between a position in contact with a side of the first control gear (23b) and a position spaced apart from the side of the first control gear (23b), a first separation spring (56) biasing the first friction plate (52a) in a direction away from the side of the first control gear (23b), a second friction plate (52b) rotationally fixed to the second retainer (36) and axially movable between a position in contact with a side of the second control gear (24b) and a position spaced apart from the side of the second control gear (24b), a second separation spring (56) biasing the second friction plate (52b) in a direction away from the side of the second control gear (24b), a shift ring (51) axially movable between a first shift position (SP1f) where the shift ring (51) presses the first friction plate (52a) against the side of the first control gear (23b) and a second shift position (SP2f) where the shift ring (51) presses the second friction plate (52b) against the side of the second control gear (24b), and a shift mechanism (70) for axially moving the shift ring (51);

wherein one and the other of the first friction plate (52a) and the shift ring (51) are formed with a first engaging protrusion (66a) and a first engaging recess (65), respectively, the first engaging protrusion (66a) and the first engaging recess (65) being configured such that when the shift ring (51) is in the first shift position (SP1f), the first engaging protrusion (66a) is engaged in the first engaging recess (65), thereby preventing rotation of the shift ring (51) relative to the first friction plate (52a), and when the shift ring (51) is in the second shift position (SP2f), the first engaging protrusion (66a) is not engaged in the first engaging recess (65);

wherein one and the other of the second friction plate (52b) and the shift ring (51) are formed with a second engaging protrusion (66b) and a second engaging recess (65), respectively, the second engaging protrusion (66b) and the second engaging recess (65) being configured such that when the shift ring (51) is in the second shift position (SP2f), the second engaging protrusion (66b) is engaged in the second engaging recess (65), thereby preventing rotation of the shift ring (51) relative to the second friction plate (52b), and when the shift ring (51) is in the first shift position (SP1f), the second engaging protrusion (66b) is not engaged in the second engaging recess (65);

wherein a projection (63) and an annular protrusion (58) are formed on one and the other of the inner periphery of the shift ring (51) and the outer periphery of the control gear support shaft (22), respectively, wherein the annular protrusion (58) is formed with a cutout (62) through which the projection (63) can axially pass, wherein the projection (63) and the annular protrusion (58) are configured such that when the projection (63) is axially aligned with the cutout (62) of the annular protrusion (58), the projection (63) can pass through the cutout (62), thereby allowing axial movement of the shift ring (51) between the first shift position (SP1f) and the second shift position (SP2f), and when the projection (63) is axially separated from and circumferentially displaced from the cutout (62) of the annular protrusion (58), the projection (63) interferes with the annular protrusion (58), thereby preventing axial movement of the shift ring (51) between the first shift position (SP1f) and the second shift position (SP2f);

wherein the motor drive assembly further comprises an electronic control unit (100) for controlling the movement of the shifting actuator (50) and torque generated from the electric motor (10);

wherein the electronic control unit (100) comprises:

a shifting movement start control means (S2) for starting movement of the shift ring (51) from one (SP1f) of the first shift position (SP1f) and the second shift position (SP2f) corresponding to the current one of two speed ratios toward the other shift position (SP2f), which corresponds to the next one of the two speed ratios, when a command is received to shift the speed ratio by disengaging one of the first two-way roller clutch (30A) and the second two-way roller clutch (30B) corresponding to the current speed ratio and engaging the other two-way roller clutches (30B), which corresponds to the next speed ratio;

a position determining means (S3) for determining whether the shift ring (51) has reached a predetermined torque control starting position (SP1t) after the control of the shifting movement start control means has been executed;

a torque control means (S5 and S8) for controlling the torque generated from the electric motor (10) such that torque transmitted between the input shaft (21) and the output shaft (22) decreases to zero or is reversed in direction when the shift position determining means (S3) determines that the shift ring (51) has reached the torque control starting position (SP12t); and a synchronization control means (S8 to S27) for synchronizing the rotational speed of the input shaft with the rotational speed of the output shaft (22) corresponding to the next speed ratio (r2) after controlling the torque with the torque control means (S6 and S8).

2. The motor drive assembly of claim 1, wherein the electronic control unit (100) further comprises a torque direction determining means (S4) for determining whether the torque being transmitted between the input shaft (21) and the output shaft (22) is torque in a positive direction that tends to accelerate the output shaft (22) from the input shaft (21), or torque in a negative direction that tends to decelerates the output shaft (22) from the input shaft (21), when the command to shift the speed ratio is received.

3. The motor drive assembly of claim 2, wherein the torque control means (S8) controls the electric motor (10) such that the motor (10) generates negative torque (T2) which decelerates the rotation of the motor (10), if the command to shift the speed ratio is a command to upshift and if the direction of the torque (T1) detected by the torque direction determining means (S4) is the positive direction.

4. The motor drive assembly of claim 3, wherein the synchronization control means (S8 to S27) maintains the torque (T) generated from the electric motor (10) at the negative torque (T2) until the difference between the actual rotational speed of the input shaft (21) and the rotational speed of the input shaft (21) in the next speed ratio which is calculated based on the rotational speed of the output shaft (22) decreases to a predetermined threshold (DN2) or below, if the command to shift the speed ratio is a command to upshift and if the direction of the torque (T1) detected by the torque direction determining means (S4) is the positive direction.

5. The motor drive assembly of claim 3, wherein the torque control means (S5 and S8) controls the electric motor (10) such that the motor (10) generates positive torque (T4) which accelerates the rotation of the motor (10), if the command to shift the speed ratio is a command to upshift and if the direction of the torque (T1) detected by the torque direction determining means (S4) is the negative direction.

6. The motor drive assembly of claim 3, wherein the synchronization control means (S8 to S27) controls the electric motor (10) such that the motor (10) generates negative torque (T2) which decelerates the rotation of the motor (10), and maintains the torque (T) generated from the electric motor (10) at the negative torque (T2) until the difference between the actual rotational speed of the input shaft (21) and the rotational speed of the input shaft (21) in the next speed ratio which is calculated based on the rotational speed of the output shaft (22) decreases to a predetermined threshold (DN2) or below, if the command to shift the speed ratio is a command to upshift and if the direction of the torque (T1) detected by the torque direction determining means (S4) is the negative direction.

7. The motor drive assembly of claim 3, wherein the torque control means (S5 and S8) controls the torque (T) generated from the electric motor (10) to zero, if the command to shift the speed ratio is a command to downshift and if the direction of the torque (T1) detected by the torque direction determining means (S4) is the positive direction.

8. The motor drive assembly of claim 3, wherein the synchronization control means (S8 to S27) controls the electric motor (10) such that the motor (10) generates positive torque (T2) which accelerates the rotation of the motor (10), and maintains the torque (T) generated from the electric motor (10) at the positive torque (T2) until the difference between the actual rotational speed of the input shaft (21) and the rotational speed of the input shaft (21) in the next speed ratio which is calculated based on the rotational speed of the output shaft (22) decreases to a predetermined threshold (DN2) or below, if the command to shift the speed ratio is a command to downshift and if the direction of the torque (T1) detected by the torque direction determining means (S4) is the positive direction.

9. The motor drive assembly of claim 3, wherein the torque control means controls the electric motor (10) such that the motor (10) generates positive torque (T2) which accelerates the rotation of the motor (10), if the command to shift the speed ratio is a command to downshift and if the direction of the torque (T1) detected by the torque direction determining means (S4) is the negative direction.

10. The motor drive assembly of claim 3, wherein the synchronization control means (S8 to S27) maintains the torque (T) generated from the electric motor (10) at positive torque (T2) until the difference between the actual rotational speed of the input shaft (21) and the rotational speed of the input shaft (21) in the next speed ratio which is calculated based on the rotational speed of the output shaft (22) decreases to a predetermined threshold (DN2) or below, if the command to shift the speed ratio is a command to downshift and if the direction of the torque (T1) detected by the torque direction determining means (S4) is the positive direction.

11. The motor drive assembly of claim 2, wherein the torque control means (S5 and S8) controls the electric motor (10) such that the motor (10) generates positive torque (T4) which accelerates the rotation of the motor (10), if the command to shift the speed ratio is a command to upshift and if the direction of the torque (T1) detected by the torque direction determining means (S4) is the negative direction.

12. The motor drive assembly of claim 2, wherein the synchronization control means (S8 to S27) controls the electric motor (10) such that the motor (10) generates negative torque (T2) which decelerates the rotation of the motor (10), and maintains the torque (T) generated from the electric motor (10) at the negative torque (T2) until the difference between the actual rotational speed of the input shaft (21) and the rotational speed of the input shaft (21) in the next speed ratio which is calculated based on the rotational speed of the output shaft (22) decreases to a predetermined threshold (DN2) or below, if the command to shift the speed ratio is a command to upshift and if the direction of the torque (T1) detected by the torque direction determining means (S4) is the negative direction.

13. The motor drive assembly of claim 2, wherein the torque control means (S5 and S8) controls the torque (T) generated from the electric motor (10) to zero, if the command to shift the speed ratio is a command to downshift and if the direction of the torque (T1) detected by the torque direction determining means (S4) is the positive direction.

14. The motor drive assembly of claim 2, wherein the synchronization control means (S8 to S27) controls the electric motor (10) such that the motor (10) generates positive torque (T2) which accelerates the rotation of the motor (10), and maintains the torque (T) generated from the electric motor (10) at the positive torque (T2) until the difference between the actual rotational speed of the input shaft (21) and the rotational speed of the input shaft (21) in the next speed ratio which is calculated based on the rotational speed of the output shaft (22) decreases to a predetermined threshold (DN2) or below, if the command to shift the speed ratio is a command to downshift and if the direction of the torque (T1) detected by the torque direction determining means (S4) is the positive direction.

15. The motor drive assembly of claim 2, wherein the torque control means controls the electric motor (10) such that the motor (10) generates positive torque (T2) which accelerates the rotation of the motor (10), if the command to shift the speed ratio is a command to downshift and if the direction of the torque (T1) detected by the torque direction determining means (S4) is the negative direction.

16. The motor drive assembly of claim 2, wherein the synchronization control means (S8 to S27) maintains the torque (T) generated from the electric motor (10) at positive torque (T2) until the difference between the actual rotational speed of the input shaft (21) and the rotational speed of the input shaft (21) in the next speed ratio which is calculated based on the rotational speed of the output shaft (22) decreases to a predetermined threshold (DN2) or below, if the command to shift the speed ratio is a command to downshift and if the direction of the torque (T1) detected by the torque direction determining means (S4) is the positive direction.

17. An electric vehicle comprising a pair of right and left front wheels (1) provided at a front portion of the vehicle, a pair of right and left rear wheels (2) provided at a rear portion of the vehicle, and the motor drive assembly of claim 2, wherein the motor drive assembly is configured to drive at least one pair of the pairs of front wheels and rear wheels.

18. A hybrid vehicle comprising a pair of right and left front wheels (1) provided at a front portion of the vehicle, a pair of right and left rear wheels (2) provided at a rear portion of the vehicle, an engine (E) for driving one pair of the pairs of front wheels and rear wheels, and the motor drive assembly of claim 2, wherein the motor drive assembly is configured to drive the other pair of the pairs of front wheels and rear wheels.

19. An electric vehicle comprising a pair of right and left front wheels (1) provided at a front portion of the vehicle, a pair of right and left rear wheels (2) provided at a rear portion of the vehicle, and the motor drive assembly of claim 1, wherein the motor drive assembly is configured to drive at least one pair of the pairs of front wheels and rear wheels.

20. A hybrid vehicle comprising a pair of right and left front wheels (1) provided at a front portion of the vehicle, a pair of right and left rear wheels (2) provided at a rear portion of the vehicle, an engine (E) for driving one pair of the pairs of front wheels and rear wheels, and the motor drive assembly of claim 1, wherein the motor drive assembly is configured to drive the other pair of the pairs of front wheels and rear wheels.

* * * * *